(12) United States Patent
Ohzeki et al.

(10) Patent No.: US 8,348,410 B2
(45) Date of Patent: Jan. 8, 2013

(54) INK SET FOR INKJET RECORDING AND IMAGE RECORDING METHOD

(75) Inventors: Tomoyuki Ohzeki, Kanagawa (JP); Terukazu Yanagi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 612 days.

(21) Appl. No.: 12/543,532

(22) Filed: Aug. 19, 2009

(65) Prior Publication Data

US 2010/0053288 A1 Mar. 4, 2010

(30) Foreign Application Priority Data

Sep. 2, 2008 (JP) ................................. 2008-225109

(51) Int. Cl.
*G01D 11/00* (2006.01)
(52) U.S. Cl. ........................... 347/100; 347/96; 523/160
(58) Field of Classification Search .................. 347/100, 347/95, 96, 101, 102; 106/31.6, 31.27, 31.13; 523/160, 161
See application file for complete search history.

(56) References Cited

U.S. PATENT DOCUMENTS

| | | | | |
|---|---|---|---|---|
| 4,119,478 A | * | 10/1978 | Robertson | 106/493 |
| 6,057,384 A | | 5/2000 | Nguyen et al. | |
| 2004/0173120 A1 | * | 9/2004 | Tsuru et al. | 106/31.6 |
| 2007/0054981 A1 | | 3/2007 | Yanagi et al. | |
| 2007/0209550 A1 | * | 9/2007 | Tsuru et al. | 106/31.6 |
| 2008/0192098 A1 | * | 8/2008 | Tsuru et al. | 347/100 |
| 2010/0003408 A1 | * | 1/2010 | Yanagi et al. | 427/256 |

FOREIGN PATENT DOCUMENTS

| | | |
|---|---|---|
| JP | 9-207424 A | 8/1997 |
| JP | 3069543 B2 | 7/2000 |
| JP | 200252804 | 2/2002 |
| JP | 3534395 B2 | 6/2004 |

* cited by examiner

*Primary Examiner* — Manish S Shah
(74) *Attorney, Agent, or Firm* — SOLARIS Intellectual Property Group, PLLC

(57) ABSTRACT

An ink set for inkjet recording including an ink composition including a dispersion of a pigment dispersed by a water-insoluble polymer which is formed by copolymerizing a monomer mixture containing a styrenic macromer, as well as self-dispersing polymer particles, a water-soluble organic solvent, and water; and a reactive liquid which forms an aggregate when contacted with the ink composition; and an image recording method using the ink set, are provided.

22 Claims, No Drawings

INK SET FOR INKJET RECORDING AND IMAGE RECORDING METHOD

CROSS-REFERENCE TO RELATED APPLICATION

This application claims priority under 35 USC 119 from Japanese Patent Application No. 2008-225109 filed on Sep. 2, 2008, the disclosure of which is incorporated by reference herein.

BACKGROUND OF THE INVENTION

1. Field of the Invention

The present invention relates to an ink set for inkjet recording, and an image recording method.

2. Description of the Related Art

An inkjet recording method performs recording by respectively ejecting ink droplets from a large number of nozzles formed on an inkjet head, and is widely used for the reasons that noise at the time of a recording operation is low, running costs are inexpensive and a high definition image can be recorded on a large variety of recording media.

As an inkjet recording method, there is known a two liquid reaction method in which two liquids such as an ink and a treating liquid for aggregating the ink are allowed to react with each other, and thus the ink is aggregated, to thereby accelerate fixation of the ink.

For example, as an inkjet recording method capable of suppressing bleeding of print and print irregularities, an inkjet recording method of attaching, onto a recording medium, an ink composition which contains a reactive liquid containing a polyvalent metal salt, a pigment and a resin emulsion, is known (see, for example, Japanese Patent Application Laid-Open (JP-A) No. 9-207424).

Furthermore, as an inkjet ink composition having good water resistance and smudge resistance, an inkjet ink composition containing self-dispersing polymer fine particles is known (see, for example, Japanese Patent No. 3069543).

A water-based ink for inkjet recording containing a water-based dispersion of vinyl polymer particles incorporated with a pigment is also disclosed (see, for example, Japanese Patent No. 3534395).

SUMMARY OF THE INVENTION

The present invention has been made in view of the above circumstances and provides an ink set for inkjet recording and an image recording method.

A first aspect of the present invention provides an ink set for inkjet recording, including an ink composition including a dispersion of a pigment dispersed by a water-insoluble polymer which is formed by copolymerizing a monomer mixture containing a styrenic macromer, as well as self-dispersing polymer particles, a water-soluble organic solvent and water; and a reactive liquid which forms aggregates by contacting with the ink composition.

A second aspect of the present invention provides an image recording method using the ink set for inkjet recording according to the first aspect.

DETAILED DESCRIPTION OF THE INVENTION

<Ink Set for Inkjet Recording>

The ink set for inkjet recording of the present invention includes:

at least one ink composition including a pigment dispersion dispersed by a water-insoluble polymer formed by copolymerizing a monomer mixture containing a styrenic macromer, as well as self-dispersing polymer particles, a water-soluble organic solvent and water; and a reactive liquid which forms aggregates by contacting with the ink composition.

The ink set for inkjet recording of the invention having a constitution as described above, particularly in which the ink composition includes a pigment dispersion dispersed by a specific water-insoluble polymer and contains self-dispersing polymer particles, exhibits a further enhanced rate of aggregation formation resulting from contact between the ink composition and the reactive liquid, does not cause changes in the dot diameter of ink droplets of primary color (first color) as well as secondary color (second color) and so forth, enhances the accuracy of spotting position, and is capable of forming images with high resolution.

The ink set of the invention is to be used for an inkjet recording method, but may also be used in applications such as general writing instruments, recorders, and pen-plotters.

[Ink Composition]

The ink composition according to the invention contains a pigment dispersion dispersed by a water-insoluble polymer formed by copolymerizing a monomer mixture including a styrenic macromer, and also contains self-dispersing polymer particles, a water-soluble organic solvent, and water.

The ink composition according to the invention may be used in the formation of monochromic images as well as in the formation of full color images, and is more effective for the formation of color images with two or more colors. For the formation of full color images, a magenta tone ink, a cyan tone ink and a yellow tone ink may be used, while a black tone ink may be further used to adjust the color tones. In addition to the yellow, magenta and cyan tone inks, red, green, blue and white inks, or so-called special color inks in the field of printing (for example, colorless) may be used.

—Pigment Dispersion—

The ink composition according to the invention contains at least one dispersion of a pigment (pigment dispersion) which is dispersed by a water-insoluble polymer formed by copolymerizing a monomer mixture including a styrenic macromer.

(Water-Insoluble Polymer)

The water-insoluble polymer (may also be referred to as "second polymer") according to the invention is a polymer formed by copolymerizing a monomer mixture including a styrenic macromer.

According to an exemplary embodiment, the monomer mixture is a mixture which includes at least the above-described (b) styrenic macromer, and further includes:

(a) a salt-generating group-containing monomer, (c) a styrenic monomer, and (d) a monomer represented by formula (I): $CH_2=C(R^1)COO(R^2)_pR^3$ (wherein $R^1$ represents a hydrogen atom or a lower alkyl group; $R^2$ represents a divalent hydrocarbon group having 1 to 30 carbon atoms, which may have a heteroatom; $R^3$ represents a monovalent hydrocarbon group having 1 to 30 carbon atoms, which may have a heteroatom; and p represents an integer of from 1 to 60).

As the (a) salt-generating group-containing monomer, a cationic monomer, an anionic monomer and the like may be mentioned, and for example, those described in JP-A No. 9-286939, page 5, column 7, line 24 to column 8, line 29, may be mentioned. Representative examples of the cationic monomer include unsaturated tertiary amine-containing monomers, unsaturated ammonium salt-containing monomers, and the like, and among these, N,N-dimethylaminoethyl(meth) acrylate, N—(N'N'-dimethylaminopropyl)(meth)acrylamide, and vinylpyrrolidone are preferred. Representative examples of the anionic monomer include unsaturated carboxylic acid monomers, unsaturated sulfonic acid monomers, unsaturated phosphoric acid monomers, and the like, and among these, unsaturated carboxylic acid monomers such as acrylic acid and methacrylic acid are preferred.

The (b) styrenic macromer is a monomer having a polymerizable unsaturated group, and having a number average molecular weight of 500 to 100,000, and preferably 1000 to 10,000.

Among them, a styrenic macromer having a polymerizable functional group at one end is preferred.

The (b) styrenic macromer is a compound which may be suitably used in view of sufficiently incorporating a pigment into the water-insoluble polymer. As the styrenic macromer, there may be mentioned a styrene homopolymer or a copolymer of styrene and another monomer, both of which have a polymerizable functional group at one end. Among these, those having an acryloyloxy group or a methacryloyloxy group as the polymerizable functional group at one end are preferred. The styrene content in the aforementioned copolymer is preferably 60 mass % or more, and more preferably 70 mass % or more, from the viewpoint of making the pigment sufficiently incorporated into the water-insoluble polymer. As the other monomer, acrylonitrile or the like may be mentioned.

It is preferable that the monomer mixture contains a silicone macromer, in addition to the (b) styrenic macromer, in view of preventing sticking of the ink to the head of inkjet printers.

As the silicone macromer, a silicone macromer represented by formula (II): $X(Y)_q Si(R^4)_{3-r}(Z)_r$ (wherein X represents a polymerizable unsaturated group; Y represents a divalent linking group; $R^4$s each independently represent a hydrogen atom, a lower alkyl group, an aryl group or an alkoxy group; Z represents a monovalent residue of a siloxane polymer having a number average molecular weight of 500 or more; q represents 0 or 1; and r represents an integer of from 1 to 3) is preferred.

In regard to the silicone macromer represented by formula (II), a monovalent unsaturated hydrocarbon group having 2 to 6 carbon atoms, such as a $CH_2=CH-$ group or a $CH_2=C(CH_3)-$ group, may be mentioned for X. For Y, a divalent linking group such as a $-COO-$ group, a $-COOC_aH_{2a}-$ group (wherein a represents an integer of from 1 to 5) or a phenylene group, may be mentioned, while $-COOC_3H_6-$ is preferred. As for $R^4$, there may be mentioned a hydrogen atom; a lower alkyl group having 1 to 5 carbon atoms, such as a methyl group or an ethyl group; an aryl group having 6 to 20 carbon atoms such as a phenyl group; an alkoxy group having 1 to 20 carbon atoms, such as a methoxy group; and the like, and among these, a methyl group is preferred. Z is preferably a monovalent residue of a dimethylsiloxane polymer having a number average molecular weight of 500 to 5000. q is 0 or 1, but is preferably 1. r is an integer of from 1 to 3, but is preferably 1.

Representative examples of the silicone macromer include:
a silicone macromer represented by formula (II-1):

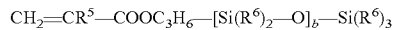

wherein $R^5$ represents a hydrogen atom or a methyl group; $R^6$s each independently represent a hydrogen atom or a lower alkyl group having 1 to 5 carbon atoms; and b represents a number of from 5 to 60;
a silicone macromer represented by formula (II-2):

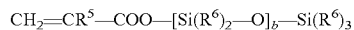

wherein $R^5$, $R^6$ and b each have the same meaning as in formula (II-1);
a silicone macromer represented by formula (II-3):

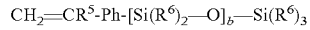

wherein Ph represents a phenylene group; and $R^5$, $R^6$ and b each have the same meaning as in formula (II-1);
a silicone macromer represented by formula (II-4):

wherein $R^5$ has the same meaning as in formula (II-1); and E represents a group of formula: $-[Si(R^5)_2O]_c-Si(R^5)_3$ (wherein $R^5$ has the same meaning as in formula (II-1); and c represents a number of from 5 to 65)); and the like.

Among these, the silicone macromer represented by formula (II-1) is preferred, and in particular, a silicone macromer represented by formula (II-1a): $CH_2=C(CH_3)-COOC_3H_6-[Si(CH_3)_2-O]_d-CH_3$ (wherein d represents a number of from 8 to 40) is preferred. Examples thereof include FM-0711 (trade name, manufactured by Chisso Corporation), and the like.

In the invention, the number average molecular weight is measured by gel chromatography using chloroform containing dodecyldimethylamine at 1 mmol/L as a solvent, while polystyrene is used as the standard material.

As the (c) styrenic monomer, styrenic monomers such as styrene, vinyltoluene, 2-methylstyrene and chlorostyrene may be mentioned, and these may be used alone, or as a mixture of two or more of them. Here, the terms (iso or tertiary) and (iso) are meant to include both the case where these groups are present and the case where these groups are not present. If these groups are not present, the compound is indicated as normal.

The (c) styrenic monomer is preferably styrene or 2-methylstyrene, from the viewpoint of enhancing print density and marker resistance, and these may be used alone or may be used in combination.

It is preferable that the monomer mixture further contains (d) a monomer represented by

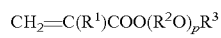          formula (I):

wherein $R^1$ represents a hydrogen atom or a lower alkyl group; $R^2$ represents a divalent hydrocarbon group having 1 to 30 carbon atoms, which may have a heteroatom; $R^3$ represents a monovalent hydrocarbon group having 1 to 30 carbon atoms, which may have a heteroatom; and p represents an integer of from 1 to 60.

The component (d) is a component exhibiting excellent effects of increasing the ejection stability of the water-based ink of the invention, and suppressing the occurrence of cockling even upon continuous printing. In formula (I), $R^1$ is a hydrogen atom or a lower alkyl group. As the lower alkyl group, an alkyl group having 1 to 4 carbon atoms may be mentioned. $R^2$ is a divalent hydrocarbon group having 1 to 30 carbon atoms, which may have a heteroatom. Examples of the heteroatom include a nitrogen atom, an oxygen atom, a halogen atom and a sulfur atom. Representative examples of $R^2$ include an aromatic ring having 6 to 30 carbon atoms, which may be substituted by a substituent; a heterocycle ring having 3 to 30 carbon atoms, which may be substituted by a substituent; and an alkylene group having 1 to 30 carbon atoms, which may be substituted by a substituent, and these rings or groups may form a combination of two or more of them. Examples of the substituent include an aromatic ring having 6 to 29 carbon atoms, a heterocycle ring having 3 to 29 carbon atoms, an alkyl group having 1 to 29 carbon atoms, a halogen atom, an amino group, and the like. Suitable examples of $R^2$ include a phenylene group which may be substituted with a substituent having 1 to 24 carbon atoms; an aliphatic alkylene group having 1 to 30, and preferably 1 to 20, carbon atoms; an alkylene group having 7 to 30 carbon atoms and having an aromatic ring; and an alkylene group having 4 to 30 carbon atoms and having a heterocycle ring. Furthermore, suitable examples of the $R^2O$ group include an ethylene oxide group, an (iso)propylene oxide group, a tetramethylene oxide group, a heptamethylene oxide group, a hexamethylene oxide group, and an alkylene oxide group having 2 to 7 carbon atoms, which includes a combination of one or more of these alkylene oxides, as well as a phenylene oxide group.

$R^3$ is a monovalent hydrocarbon group having 1 to 30 carbon atoms, which may have a heteroatom. Examples of the heteroatom include a nitrogen atom, an oxygen atom and a sulfur atom. Representative examples of $R^3$ include an aromatic ring having 6 to 30 carbon atoms, which may be substituted with a substituent; a heterocycle ring having 3 to 30 carbon atoms, which may be substituted with a substituent; or an alkyl group having 1 to 30 carbon atoms, which may be substituted with a substituent. As the substituent, an aromatic ring having 6 to 29 carbon atoms, a heterocycle ring having 4 to 29 carbon atoms, a halogen atom, an amino group, and the like may be mentioned. Suitable examples of $R^3$ include a phenyl group; an aliphatic alkyl group having 1 to 30, and preferably 1 to 20, carbon atoms; an alkyl group having 7 to 30 carbon atoms and having an aromatic ring; and an alkyl group having 4 to 30 carbon atoms and having a heterocycle ring. More suitable examples of $R^3$ include an alkyl group having 1 to 6 carbon atoms, such as a methyl group, an ethyl group, an (iso)propyl group, an (iso)butyl group, an (iso)pentyl group or an (iso)hexyl group; a phenyl group; and the like.

p is an integer of from 1 to 60, but among these, an integer of from 1 to 30 is preferred.

Specific examples of the component (d) include methoxypolyethylene glycol (1 to 30: these numbers represent the value of p in formula (I); hereinafter, the same) (meth)acrylate, methoxypolytetramethylene glycol (1 to 30) (meth)acrylate, ethoxypolyethylene glycol (1 to 30) (meth)acrylate, (iso)propoxypolyethylene glycol (1 to 30) (meth)acrylate, butoxypolyethylene glycol (1 to 30) (meth)acrylate, methoxypolypropylene glycol (1 to 30) (meth)acrylate, methoxy (ethylene glycol/propylene glycol copolymerized) (1 to 30; among which, ethylene glycol: 1 to 29) (meth)acrylate, and the like. These may be used alone, or as a mixture of two or more of them. Among these, methoxypolyethylene glycol (1 to 30) (meth)acrylate is preferred. Here, the term "(meth)acrylate" as used in the present specification represents acrylate or methacrylate. Also, the term "(iso)propoxy" represents n-propoxy or isopropoxy.

It is also preferable that the monomer mixture contain (e) a hydroxy group-containing monomer.

As the component (e), 2-hydroxyethyl(meth)acrylate, 3-hydroxypropyl(meth)acrylate, polyethylene glycol (n=2 to 30) (meth)acrylate, poly(ethylene glycol (n=1 to 15).propylene glycol (n=1 to 15)) (meth)acrylate, and the like may be mentioned. Among these, 2-hydroxyethyl(meth)acrylate is preferred.

The monomer mixture may also contain a polymerizable monomer other than those mentioned above. Examples of this polymerizable monomer include (meth)acrylic acid esters such as methyl(meth)acrylate, ethyl(meth)acrylate, (iso)propyl(meth)acrylate, (iso or tertiary)butyl(meth)acrylate, (iso)amyl(meth)acrylate, cyclohexyl(meth)acrylate, benzyl(meth)acrylate, 2-ethylhexyl(meth)acrylate, (iso)octyl(meth)acrylate, (iso)decyl(meth)acrylate, (iso)dodecyl(meth)acrylate, and (iso)stearyl(meth)acrylate.

The content of the structural unit derived from the (a) salt-generating group-containing monomer with respect to the water-insoluble polymer is preferably 1 mass % to 50 mass %, and more preferably 2 mass % to 40 mass %, from the viewpoint of the dispersion stability of the dispersion to be obtained.

The content of the structural unit derived from the (b) styrenic macromer with respect to the water-insoluble polymer is preferably 1 mass % to 25 mass %, and more preferably 5 mass % to 20 mass %, from the viewpoint of suppressing sticking of the ink to the heater surface of inkjet printers, and from the viewpoint of stability.

The content of the structural unit derived from the (c) styrenic monomer with respect to the water-insoluble polymer is preferably 5 mass % to 93 mass %, more preferably 10 mass % to 80 mass %, and even more preferably 10 mass % to 60 mass %, from the viewpoint of suppressing sticking of the ink to the heater surface of inkjet printers, and from the viewpoint of stability.

The content of the structural unit derived from the (e) hydroxy group-containing monomer with respect to the water-insoluble polymer is preferably 5 mass % to 40 mass %, and more preferably 7 mass % to 20 mass %, from the viewpoints of ejection stability and print density. Furthermore, the total content of the components (a) and (e) is preferably 6 mass % to 60 mass %, and more preferably 10 mass % to 50 mass %, from the viewpoints of stability in water and water resistance.

The content of the component (d) with respect to the water-insoluble polymer is preferably 5 mass % to 50 mass %, and more preferably 10 mass % to 40 mass %, from the viewpoints of ejection stability and dispersion stability. Furthermore, the total content of the components (a) and (d) with respect to the water-insoluble polymer is preferably 6 mass % to 75 mass %, from the viewpoints of dispersion stability in water and ejection stability.

The total content of the components (a), (d) and (e) with respect to the water-insoluble polymer is 6 mass % to 60 mass %, and more preferably 7 mass % to 50 mass %, from the viewpoints of dispersion stability in water and ejection stability.

The water-insoluble polymer is produced by copolymerizing the monomer mixture by a known polymerization method such as a bulk polymerization method, a solution polymerization method, a suspension polymerization method or an emulsion polymerization method. Among these polymerization methods, a solution polymerization method is preferred.

As the solvent used in the solution polymerization method, a polar organic solvent is preferred, and a water-miscible organic solvent may be used as a mixture with water. Examples of such organic solvents include aliphatic alcohols having 1 to 3 carbon atoms, such as methanol, ethanol and propanol; ketones such as acetone and methyl ethyl ketone; esters such as ethyl acetate; and the like. Among these, methanol, ethanol, acetone, methyl ethyl ketone, or mixtures of these with water are preferred.

At the time of polymerization, a radical polymerization initiator may be used. As the radical polymerization initiator, azo compounds such as 2,2'-azobisisobutylnitrile, 2,2'-azobis(2,4-dimethylvaleronitrile), dimethyl-2,2'-azobisbutyrate, 2,2'-azobis(2-methylbutyronitrile), and 1,1'-azobis(1-cyclohexanecarbonitrile) are suitable. Organic peroxides such as t-butyl peroxyoctoate, di-t-butyl peroxide and dibenzoyl oxide may also be used. The amount of the polymerization initiator is preferably 0.001 mass % to 5 mol %, and particularly preferably 0.01 mass % to 2 mol %, with respect to the monomer mixture.

At the time of polymerization, a polymerization chain transfer agent may also be added. Specific examples of the polymerization chain transfer agent include mercaptans such as octylmercaptan, n-dodecylmercaptan, t-dodecylmercaptan, n-tetradecylmercaptan and mercaptoethanol; xanthogen disulfides such as dimethylxanthogen disulfide and diisopropylxanthogen disulfide; thiuram disulfides such as tetramethylthiuram disulfide and tetrabutylthiuram disulfide; halogenated hydrocarbons such as carbon tetrachloride and ethylene bromide; hydrocarbons such as pentaphenylethane; unsaturated cyclic hydrocarbon compounds such as acrolein, methacrolein, allyl alcohol, 2-ethylhexyl thioglycolate, terpinolene, α-terpinene, γ-terpinene, dipentene, α-methylstyrene dimer, 9,10-dihydroanthracene, 1,4-dihydronaphthalene, indene and 1,4-cyclohexadiene; unsaturated heterocycle compounds such as 2,5-dihydrofuran; and the like. These may be used alone or in a combination of two or more of them.

The polymerization conditions for the monomer mixture may vary depending on the type of the radical polymerization initiator, monomer or solvent used, or the like, but the polymerization temperature is usually 30° C. to 100° C., and preferably 50° C. to 80° C., and the polymerization time is 1 hour to 20 hours. The polymerization atmosphere is preferably an inert gas atmosphere such as that of nitrogen gas.

After completion of the polymerization reaction, the copolymer may be isolated according to a known method such as reprecipitation from the reaction solution, or solvent distillation. The resulting copolymer may be purified by removing any unreacted monomers or the like, by repeating reprecipitation or performing membrane separation, a chromatography method or an extraction method.

The weight average molecular weight (measured by the method described in the Production Examples 1 to 6 that will be described later) of the water-insoluble polymer is preferably 3000 to 200,000, and more preferably 5000 to 100,000, from the viewpoint of ejectability, prevention of sticking of the ink to printer heads, durability of the ink after printing, and stability of the dispersion material.

(Pigment)

The ink composition according to the invention contains at least one pigment which is dispersed by a water-insoluble polymer in the aforementioned pigment dispersion.

The pigment that may be used in the invention is not particularly limited in its kind, and any one of the conventionally known organic and inorganic pigments may be used. Examples of the pigment that may be used include polycyclic pigments such as azo lake, azo pigment, phthalocyanine pigment, perylene and perynone pigments, anthraquinone pigment, quinacridone pigment, dioxadine pigment, diketopyrrolopyrrole pigment, thioindigo pigment, isoindolinone pigment and quinophthalone pigment; dye lakes such as basic dye type lake and acidic dye type lake; organic pigments such as nitro pigment, nitroso pigment, aniline black and daylight fluorescent pigment; and inorganic pigments such as titanium oxide, iron oxide type and carbon black type. Even pigments that are not described in Color Index can be used so long as it is a pigment capable of being dispersed in an aqueous phase. Furthermore, those obtained by surface treating the above-described pigments with a surfactant, a polymeric dispersant or the like, and grafted carbon can also be used. Among the above pigments, azo pigment, phthalocyanine pigment, anthraquinone pigment, quinacridone pigment and carbon black type pigment are preferably used.

Specific examples of the organic pigment used in the invention are described below.

Examples of the organic pigment for orange or yellow include C.I. Pigment Orange 31, C.I. Pigment Orange 43, C.I. Pigment Yellow 12, C.I. Pigment Yellow 13, C.I. Pigment Yellow 14, C.I. Pigment Yellow 15, C.I. Pigment Yellow 17, C.I. Pigment Yellow 74, C.I. Pigment Yellow 93, C.I. Pigment Yellow 94, C.I. Pigment Yellow 128, C.I. Pigment Yellow 138, C.I. Pigment Yellow 151, C.I. Pigment Yellow 155, C.I. Pigment Yellow 180 and C.I. Pigment Yellow 185.

Examples of the organic pigment for magenta or red include C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 48:1, C.I. Pigment Red 53:1, C.I. Pigment Red 57:1, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 177, C.I. Pigment Red 178, C.I. Pigment Red 222 and C.I. Pigment Violet 19.

Examples of the organic pigment for green or cyan include C.I. Pigment Blue 15, C.I. Pigment Blue 15:2, C.I. Pigment Blue 15:3, C.I. Pigment Blue 15:4, C.I. Pigment Blue 16, C.I. Pigment Blue 60, C.I. Pigment Green 7, and siloxane-crosslinked aluminum phthalocyanine described in U.S. Pat. No. 4,311,775.

Examples of the organic pigment for black include C.I. Pigment Black 1, C.I. Pigment Black 6 and C.I. Pigment Black 7.

In addition to that, silica, calcium carbonate, talc and the like may be used as extender pigments.

The amount of the pigment is 20 to 400 parts, and preferably 50 to 300 parts, relative to 100 parts of the resin solids of the water-insoluble polymer, from the viewpoints of the print density and the ease of incorporation into the water-insoluble polymer particles.

A water-based dispersion of a water-insoluble polymer particles containing a pigment (pigment dispersion) may be obtained by, for example, dissolving a water-insoluble polymer in an organic solvent, adding a pigment into the resulting solution, preliminarily kneading the mixture, subsequently adding a neutralizer and water, kneading the mixture to prepare a oil-in-water type dispersion, and distilling off the organic solvent from the resulting kneaded product. Furthermore, a water-based dispersion may also be obtained by polymerizing the above-described monomer mixture, adding a pigment to the resulting water-insoluble polymer solution, and then treating in a similar manner to that described above.

As the organic solvent, an alcohol solvent, a ketone solvent and an ether solvent are preferred, and a hydrophilic organic solvent is more preferred. As the alcohol solvent, methanol, ethanol, isopropanol, n-butanol, tertiary butanol, isobutanol, diacetone alcohol and the like may be mentioned. As the ketone solvent, acetone, methyl ethyl ketone, diethyl ketone, methyl isobutyl ketone and the like may be mentioned. As the ether solvent, dibutyl ether, tetrahydrofuran, dioxane and the like may be mentioned. Among these solvents, isopropanol, acetone and methyl ethyl ketone are preferred. Also, if necessary, these organic solvents may be used in combination with high boiling point hydrophilic organic solvents. As the high boiling point hydrophilic organic solvents, phenoxyethanol, ethylene glycol monomethyl ether, diethylene glycol monomethyl ether, diethylene glycol monoethyl ether, diethylene glycol diethyl ether and the like may be mentioned.

As the neutralizer, an acid or a base may be used in accordance with the type of the salt-generating group. As the acid, there may be mentioned an inorganic acid such as hydrochloric acid or sulfuric acid, and an organic acid such as acetic acid, propionic acid, lactic acid, succinic acid, glycolic acid, gluconic acid or glyceric acid. As the base, there may be mentioned a tertiary amines such as trimethylamine or triethylamine, ammonia, sodium hydroxide, potassium hydroxide, or the like. The degree of neutralization is not particularly limited. In general, the liquid property of the water-based dispersion to be obtained is preferably neutral, for example, the pH is preferably 4.5 to 9.

The particle size of the water-insoluble polymer particles containing a pigment is preferably 0.01 µm to 0.50 µm, and more preferably 0.02 µm to 0.20 µm, from the viewpoints of preventing the clogging of nozzles and enhancing dispersion stability. The amount of the pigment dispersion (water-based dispersion of water-insoluble polymer particles) in the water-based ink is in general preferably adjusted such that the content of the water-insoluble polymer particles in the water-based ink is 1 mass % to 30 mass %, preferably 2 mass % to 15 mass %, from the viewpoints of the print density and ejection stability.

—Self-Dispersing Polymer Particles—

The ink composition according to the invention contains at least one species of self-dispersing polymer particles. The self-dispersing polymer particles according to the invention mean the fine particles of a water-insoluble polymer which is capable of being in a dispersion state in a water-based medium by means of the functional group (particularly, an acidic group or a salt thereof) possessed by the polymer itself in the absence of other surfactants (also referred to as "first polymer"), the water-insoluble polymer not containing any free emulsifying agent.

Here, the dispersion state is meant to include both an emulsion state in which the water-insoluble polymer is dispersed in a water-based medium in the liquid state (emulsion), and a dispersion state in which the water-insoluble polymer is dispersed in a water-based medium in the solid state (suspension).

The water-insoluble polymer according to the invention is preferably a water-insoluble polymer capable of being in a dispersion state in which the water-insoluble polymer is dispersed in the solid state, from the viewpoints of the rate of ink aggregation and ink fixability upon being contained in an ink composition.

The dispersion state of self-dispersing polymer particles according to the invention refers to a state in which even after a solution having 30 g of a water-insoluble polymer in 70 g of an organic solvent (for example, methyl ethyl ketone), a neutralizer which is capable of 100% neutralizing the salt-generating group of the water-insoluble polymer (if the salt-generating group is anionic, sodium hydroxide, and if the salt-generating group is cationic, acetic acid), and 200 g of water are mixed and stirred (apparatus: stirring apparatus equipped with a stirring blade, speed of rotation 200 rpm, for 30 minutes, 25° C.), and then the organic solvent is removed from the mixture liquid, it can be visually confirmed that the dispersion state stably exists at 25° C. for at least one week.

The "water-insoluble polymer" refers to a polymer which exhibits the dissolved amount of 10 g or less after being dried at 105° C. for 2 hours. The dissolved amount is preferably 5 g or less, and more preferably 1 g or less. A "dissolved amount" of the polymer herein means an amount which can be dissolved to 100 g of water at 25° C. when the polymer has been substantially completely neutralized with sodium hydroxide or acetic acid according to the kind of the salt-generating group of the water-insoluble polymer.

The water-based medium is composed of water, and if necessary, may also include a hydrophilic organic solvent. According to the invention, the water-based medium is preferably composed of water and 0.2 mass % or less of a hydrophilic organic solvent with respect to water, and is more preferably composed of water.

There is no particular limitation on a skeleton of a main chain of the water-insoluble polymer. Examples thereof include vinyl polymer and condensed polymers such as epoxy resin, polyester, polyurethane, polyamide, cellulose, polyether, polyurea, polyimide, or polycarbonate. Among the above, vinyl polymer is particularly preferable.

Preferable examples of the vinyl polymer and a monomer to form the vinyl polymer include those described in JP-A Nos. 2001-181549 or 2002-88294. Preferable examples thereof further include a vinyl polymer in which a dissociable group has been introduced into a terminal of a polymer chain thereof by radical polymerization of a vinyl monomer using a chain transfer agent having a dissociable group or a substituent which can be modified to be a dissociable group, a polymerization initiator, or iniferter, or by ionic polymerization using, as either an initiator or a stopper, a compound having a dissociable group or a substituent which can be modified to be a dissociable group.

Preferable examples of the condensed polymer and a monomer to form the condensed polymer include those described in JP-A No. 2001-247787.

The self-dispersing polymer particles according to the invention preferably include a water-insoluble polymer containing a hydrophilic structural unit and a structural unit derived from an aromatic group-containing monomer, from the viewpoint of self-dispersibility.

There is no limitation on the hydrophilic structural unit as long as it is derived from a hydrophilic group-containing monomer. The hydrophilic structural unit may be either a unit derived from one hydrophilic group-containing monomer or a unit derived from two or more hydrophilic group-containing monomers. The hydrophilic group is not particularly limited, and may be a dissociable group or a nonionic hydrophilic group.

From the viewpoints of promoting self dispersion and improving the stability of the formed emulsion state or the dispersion state, it is preferable that the hydrophilic group is a dissociable group, and it is more preferable that the hydrophilic group is an anionic dissociable group. Examples of the dissociable group include a carboxy group, a phosphoric acid group, and a sulfonic acid group. Among the above, from the viewpoint of improvement in fixability when an ink composition is formed of the self-dispersing polymer, a carboxy group is particularly preferable as the dissociable group.

The hydrophilic group-containing monomer according to the invention is preferably a dissociable group-containing monomer, and is preferably a dissociable group-containing monomer having a dissociable group and an ethylenically unsaturated bond, from the viewpoints of self-dispersibility and aggregation properties.

Examples of the dissociable group-containing monomer include unsaturated carboxylic acid monomers, unsaturated sulfonic acid monomers, unsaturated phosphoric acid monomers and the like.

Specific examples of the unsaturated carboxylic acid monomers include acrylic acid, methacrylic acid, crotonic acid, itaconic acid, maleic acid, fumaric acid, citraconic acid, 2-methacryloyloxymethylsuccinic acid, and the like. Specific examples of the unsaturated sulfonic acid monomers include styrenesulfonic acid, 2-acrylamide-2-methylpropanesulfonic acid, 3-sulfopropyl(meth)acrylate, bis-(3-sulfopropyl)-itaconic acid ester, and the like. Specific examples of the unsaturated phosphoric acid monomers include vinylphosphonic acid, vinyl phosphate, bis(methacryloyloxyethyl)phosphate, diphenyl-2-acryloyloxyethyl phosphate, diphenyl-2-methacryloyloxyethyl phosphate, dibutyl-2-acryloyloxyethyl phosphate, and the like.

Among the dissociable group-containing monomers, unsaturated carboxylic acid monomers are preferred, and acrylic acid and methacrylic acid are more preferred, from the viewpoints of dispersion stability and ejection stability.

The self-dispersing polymer particles according to the invention preferably include a first polymer having a carboxy group and an acid value (mg KOH/g) of 25 to 100, from the viewpoints of self-dispersibility and the rate of aggregation upon contacting with the reactive liquid. Furthermore, the acid value is more preferably 25 to 80, and particularly preferably 30 to 65, from the viewpoints of self-dispersibility and the rate of aggregation upon contacting with the reactive liquid.

When the acid value is 25 or greater, the stability of the self-dispersibility becomes satisfactory, and when the acid value is 100 or less, the aggregation properties are enhanced, which is preferable. Furthermore, the acid value of the self-dispersing polymer is preferably smaller than the acid value of the water-insoluble polymer (second polymer) in view of having a balance between the dispersion stability of the pigment and the rate of aggregation upon contacting with the reactive liquid, and the difference between the acid values is more preferably 5 to 70, and particularly preferably 10 to 70.

There is no particular limitation on the aromatic group-containing monomer as long as it is a compound containing an aromatic group and a polymerizable group. The aromatic group may be a group derived from an aromatic hydrocarbon compound or may be a group derived from a compound having an aromatic heterocycle ring. In the invention, the aromatic group is preferably an aromatic group derived from an aromatic hydrocarbon from the viewpoint of the stabilization of the shape of particles of the self-dispersing polymer in the water-based medium.

The polymerizable group may be a polymerizable group which is condensation polymerizable or may be a polymerizable group which is addition polymerizable. In the invention, from the viewpoint of improvement in stability of the shape of particles of the self-dispersing polymer in a water-based medium, the polymerizable group is preferably an addition-polymerizable polymerizable group, and more preferably a group containing an ethylenically unsaturated bond.

The aromatic group-containing monomer according to the invention is preferably a monomer having an aromatic group derived from an aromatic hydrocarbon and an ethylenically unsaturated bond, and more preferably a monomer having an aromatic group-containing (meth)acrylate monomer.

The aromatic group-containing monomers according to the invention may be used alone or in a combination of two or more of them.

Examples of the aromatic group-containing monomer include phenoxyethyl (meth)acrylate, benzyl(meth)acrylate, phenyl(meth)acrylate, styrenic monomers, and the like. Among them, from the viewpoints of the balance between hydrophilicity and hydrophobicity of the polymer chain, and ink fixability, the aromatic group-containing monomer is preferably at least one selected from phenoxyethyl(meth) acrylate, benzyl(meth)acrylate, and phenyl(meth)acrylate, more preferably phenoxyethyl(meth)acrylate, and particularly preferably phenoxyethyl acrylate.

Here, the "(meth)acrylate" means acrylate or methacrylate.

It is preferable that the self-dispersing polymer according to the invention contains a structural unit derived from an aromatic group-containing (meth)acrylate monomer, and the content is 10 mass % to 95 mass %. When the content of the aromatic group-containing (meth)acrylate monomer is 10 mass % to 95 mass %, the stability of the self-emulsified or dispersion state is enhanced, and the increase in the ink viscosity may be suppressed.

According to the invention, from the viewpoints of the stability of the self-dispersion state, stabilization of the shape of particles in the water-based medium due to the hydrophobic interaction between aromatic rings, and a decrease in the amount of the water-soluble component due to appropriate hydrophobization of the particles, the content is more preferably 15 mass % to 90 mass %, even more preferably 15 mass % to 80 mass %, and particularly preferably 25 mass % to 70 mass %.

The self-dispersing polymer according to the invention may be, for example, constituted of a structural unit derived from an aromatic group-containing monomer and a structural unit derived from a dissociable group-containing monomer, but if necessary, the self-dispersing polymer may be constituted to further include other structural units.

While there is no particular limitation on the monomer forming the another structural unit as long as the monomer can be copolymerized with the aromatic group-containing monomer and the hydrophilic group-containing monomer, an alkyl group-containing monomer is preferable from the viewpoints of the flexibility of the polymer skeleton, and ease of control of glass transition temperature (Tg).

Examples of the alkyl group-containing monomer include alkyl(meth)acrylates, such as methyl(meth)acrylate, ethyl (meth)acrylate, isopropyl(meth)acrylate, n-propyl(meth) acrylate, n-butyl(meth)acrylate, isobutyl(meth)acrylate, t-butyl(meth)acrylate, hexyl(meth)acrylate, or ethylhexyl (meth)acrylate; ethylenically unsaturated monomers having a hydroxy group, such as hydroxymethyl(meth)acrylate, 2-hydroxyethyl(meth)acrylate, 2-hydroxypropyl(meth)acrylate, 4-hydroxybutyl(meth)acrylate, hydroxypentyl(meth)acrylate, or hydroxyhexyl(meth)acrylate; dialkylamino alkyl (meth)acrylates, such as dimethylaminoethyl(meth)acrylate; N-hydroxyalkyl(meth)acrylamides, such as N-hydroxymethyl(meth)acrylamide, N-hydroxyethyl(meth)acrylamide, or N-hydroxybutyl(meth)acrylamide; (meth)acrylamides, such as N-alkoxy alkyl(meth)acrylamide, such as N-methoxymethyl(meth)acrylamide, N-ethoxymethyl(meth)acrylamide, N-(n-, iso) butoxymethyl(meth)acrylamide, N-methoxyethyl(meth)acrylamide, N-ethoxyethyl(meth) acrylamide, or N-(n-, iso) butoxyethyl(meth)acrylamide.

The range of the molecular weight of the water-insoluble polymer which constitutes the self-dispersing polymer in the invention is preferably from 3,000 to 200,000, more preferably from 5,000 to 150,000, and still more preferably from 10,000 to 100,000 in terms of weight average molecular weight. When the weight average molecular weight is adjusted to 3,000 or more, the amount of water soluble component can be effectively suppressed. Moreover, when the weight average molecular weight is adjusted to 200,000 or less, the self-dispersion stability can be increased.

The weight average molecular weight can be measured by gel permeation chromatography (GPC).

It is preferable that the water-insoluble polymer which constitutes the self-dispersing polymer fine particles according to the invention contains an aromatic group-containing (meth)acrylate monomer at a copolymerization ratio of 15 mass % to 90 mass %, and a carboxy group-containing monomer and an alkyl group-containing monomer, has an acid value of 25 to 100, and has a weight average molecular weight of 3000 to 200,000. It is more preferable that the water-insoluble polymer contains an aromatic group-containing (meth)acrylate monomer at a copolymer ratio of 15 mass % to 80 mass %, and a carboxy group-containing monomer and an alkyl group-containing monomer, has an acid value of 25 to 95, and has a weight average molecular weight of 5000 to 150,000.

Specific examples of the water-insoluble polymer which constitutes composing the self-dispersing polymer particles will be given as exemplary compounds B-01 to B-19 in the following, but the invention is not intended to be limited to these. The numbers inside the parentheses indicate the mass ratio of the copolymer components.

B-01: Phenoxyethyl acrylate/methyl methacrylate/acrylic acid copolymer (50/45/5)

B-02: Phenoxyethyl acrylate/benzyl methacrylate/isobutyl methacrylate/methacrylic acid copolymer (30/35/29/6)

B-03: Phenoxyethyl methacrylate/isobutyl methacrylate/methacrylic acid copolymer (50/44/6)

B-04: Phenoxyethyl acrylate/methyl methacrylate/ethyl acrylate/acrylic acid copolymer (30/55/10/5)

B-05: Benzyl methacrylate/isobutyl methacrylate/methacrylic acid copolymer (35/59/6)

B-06: Styrene/phenoxyethyl acrylate/methyl methacrylate/acrylic acid copolymer (10/50/35/5)

B-07: Benzyl acrylate/methyl methacrylate/acrylic acid copolymer (55/40/5)

B-08: Phenoxyethyl methacrylate/benzyl acrylate/methacrylic acid copolymer (45/47/8)

B-09: Styrene/phenoxyethyl acrylate/butyl methacrylate/acrylic acid copolymer (5/48/40/7)

B-10: Benzyl methacrylate/isobutyl methacrylate/cyclohexyl methacrylate/methacrylic acid copolymer (35/30/30/5)

B-11: Phenoxyethyl acrylate/methyl methacrylate/butyl acrylate/methacrylic acid copolymer (12/50/30/8)

B-12: Benzyl acrylate/isobutyl methacrylate/acrylic acid copolymer (93/2/5)

B-13: Styrene/phenoxyethyl methacrylate/butyl acrylate/acrylic acid copolymer (50/5/20/25)

B-14: Styrene/butyl acrylate/acrylic acid copolymer (62/35/3)

B-15: Methyl methacrylate/phenoxyethyl acrylate/acrylic acid copolymer (45/51/4)

B-16: Methyl methacrylate/phenoxyethyl acrylate/acrylic acid copolymer (45/49/6)

B-17: Methyl methacrylate/phenoxyethyl acrylate/acrylic acid copolymer (45/48/7)

B-18: Methyl methacrylate/phenoxyethyl acrylate/acrylic acid copolymer (45/47/8)

B-19: Methyl methacrylate/phenoxyethyl acrylate/acrylic acid copolymer (45/45/10)

The method for producing the water-insoluble polymer which constitutes the self-dispersing polymer particles according to the invention is not particularly limited, and for example, a method of performing emulsion polymerization in the presence of a polymerizable surfactant, to covalently bonding the surfactant and the water-insoluble polymer, and a method of copolymerizing the monomer mixture of the aforementioned hydrophilic group-containing monomer and the aromatic group-containing monomer, by a known polymerization method such as a solution polymerization method or a bulk polymerization method, may be mentioned. Among the polymerization methods, from the viewpoints of the rate of aggregation and the ejection stability when formed into an ink composition, a solution polymerization method is preferred, and a solution polymerization method using an organic solvent is more preferred.

It is preferable that the self-dispersing polymer particles according to the invention contains, from the viewpoint of the rate of aggregation, a first polymer which has been synthesized in an organic solvent, and it is preferable that the first polymer has a carboxy groups, has an acid value of 25 to 100, has at least a portion of the carboxy groups of the first polymer neutralized, and is prepared as a polymer dispersion including water as a continuous phase.

That is, the method for producing the self-dispersing polymer particles according to the invention preferably includes a process of synthesizing the first polymer in an organic solvent, and a dispersion process of making a water-based dispersion having at least a portion of the carboxy groups of the first polymer neutralized.

The dispersion process preferably includes the following process (1) and process (2).

Process (1): A process of stirring a mixture containing a first polymer (water-insoluble polymer), an organic solvent, a neutralizer, and a water-based medium.

Process (2): A process of removing the organic solvent from the mixture.

The process (1) is preferably a treatment to firstly dissolve the first polymer (the water-insoluble polymer) in an organic solvent, secondly gradually add a neutralizer and a water-based medium to the resultant, and then mixing and stirring the resultant to obtain a dispersion. By thus adding a neutralizer and a water-based medium to the water-insoluble polymer solution which has been dissolved into an organic solvent, self-dispersing polymer particles having a particle size to achieve a higher storage stability can be obtained without requiring strong shearing force.

There is no particular limitation on a method to stir the mixture, and examples thereof include a method using a generally-used mixing-stirring device and a method using a disperser such as an ultrasonic disperser or a high pressure homogenizer, as required.

Preferable examples of the organic solvent include an alcohol solvent, a ketone solvent, and an ether solvent.

Examples of the alcohol solvent include isopropanol, n-butanol, t-butanol, and ethanol. Examples of the ketone solvent include acetone, methyl ethyl ketone, diethyl ketone, and methyl isobutyl ketone. Examples of the ether solvent include dibutyl ether and dioxane. Among the above solvents, a ketone solvent such as methyl ethyl ketone, and an alcohol solvent such as isopropyl alcohol are preferable. It is also preferable to use isopropanol, and methyl ethyl ketone in combination for the purpose of moderating the polarity change at the time of the phase inversion from an oil phase to an aqueous phase. By using the solvents in combination, self-dispersing polymer particles with a fine particle size, high dispersion stability, and freeness from coagulation-precipitation and fusion of particles can be obtained.

The neutralizer is used so that a part or all of the dissociable groups are neutralized, and the self-dispersing polymer forms an emulsion state or dispersion state in water. In the case where the self-dispersing polymer has an anionic dissociable group (for example, a carboxy group) as the dissociable group, the neutralizers that may be used include basic compounds such as organic amine compounds, ammonia and hydroxides of alkali metals. Examples of the organic amine compounds include monomethylamine, dimethylamine, trimethylamine, monoethylamine, diethylamine, triethylamine, monopropylamine, dipropylamine, monoethanolamine, diethanolamine, triethanolamine, N,N-dimethylethanolamine, N,N-diethylethanolamine, 2-dimethylamino-2-methyl-1-propanol, 2-amino-2-methyl-1-propanol, N-methyldiethanolamine, N-ethyldiethanolamine, monoisopropanolamine, diisopropanolamine, triisopropanolamine, and the like. As the hydroxides of alkali metals, lithium hydroxide, sodium hydroxide, potassium hydroxide and the like may be mentioned. Among them, from the viewpoint of the dispersion stabilization of the self-dispersing polymer particles in water, sodium hydroxide, potassium hydroxide, triethylamine and triethanolamine are preferred.

The amount of the basic compound used, with respect to 100 mol % of dissociable group, is preferably from 5 mol % to 120 mol %, more preferably from 10 mol % to 110 mol %, and even more preferably from 15 mol % to 100 mol %. When the amount thereof is adjusted to 15 mol % or more, an effect of stabilizing dispersion of particles in water can be exhibited. When the amount thereof is adjusted to 100 mol % or less, an amount of water soluble component(s) can be reduced.

In the process (2), a water-based dispersion of the self-dispersing polymer particles can be obtained by converting the dispersion obtained in the process (1) to an aqueous phase by distilling off the organic solvent therefrom by a common procedure, such as vacuum distillation. The organic solvent in the obtained water-based dispersion is substantially removed, and the amount of the organic solvent is preferably 0.2 mass % or less, and more preferably 0.1 mass % or less with respect to the total mass of the water-based dispersion. The average particle size of the self-dispersing polymer particles is preferably within the range of from 10 nm to 400 nm, more preferably from 10 nm to 200 nm, and still more preferably from 10 nm to 100 nm. When the average particle size is 10 nm or more, the production suitability of the particles can be improved. When the average particle size is adjusted to 400 nm or less, the storage stability of the particles can be improved.

There is no particular limitation on the particle size distribution of the self-dispersing polymer particles. The self-dispersing polymer particles may have a broad particle size distribution or a monodispersed particle size distribution. Two or more types of water insoluble particles may be used in combination.

The average particle size and the particle size distribution of the self-dispersing polymer particles can be measured using light scattering or the like.

A single or in a combination of two or more of the self-dispersing polymer of the invention can be preferably contained in an water-based ink composition.

Water-Soluble Organic Solvent

The ink composition of the invention contains water as a solvent, and can further contain at least one water-soluble organic solvent. The water-soluble organic solvent can be contained as a drying inhibitor or a permeation accelerator.

Where the water-based ink composition of the invention is particularly applied to an image recording method by an inkjet method, the drying inhibitor can effectively prevent clogging of nozzle that may possibly be generated by drying of an ink at an ink jet orifice.

The drying inhibitor is preferably a water-soluble organic solvent having vapor pressure less than that of water. Specific examples of the drying inhibitor include polyhydric alcohols such as ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin and trimethylolpropane; lower alkyl ethers of polyhydric alcohol, such as ethylene glycol monomethyl (or ethyl) ether, diethylene glycol monomethyl (or ethyl) ether and triethylene glycol monoethyl (or butyl) ether; heterocycles such as 2-pyrrolidone, N-methyl-2-pyrrolidone, 1,3-dimethyl-2-imidazolidinone and N-ethylmorpholine; sulfur-containing compounds such as sulfolane, dimethylsufoxide and 3-sulforene; polyfunctional compounds such as diacetone alcohol and diethanolamine; and urea derivatives. Above all, polyhydric alcohols such as glycerin and diethylene glycol are preferred as the drying inhibitor. These drying inhibitors may be used alone or in a combination of two or more of them. These drying inhibitors are preferably contained in an amount of from 10 mass % to 50 mass % in the ink.

The permeation accelerator is preferably used for the purpose of well permeating the ink into a recording medium (printing paper). Specific examples of the permeation accelerator include alcohols such as ethanol, isopropanol, butanol, di(tri)ethylene glycol monobutyl ether and 1,2-hexanediol; sodium lauryl sulfate, sodium oleate and nonionic surfactants. When the permeation accelerator is contained in the ink composition in an amount of from 5 mass % to 30 mass %, sufficient effect is exhibited. The permeation accelerator is preferably used within a range of the addition amount such that bleeding of printing and print-through are not generated.

The water-soluble organic solvent can be used to adjust viscosity, other than the above. Specific examples of the water-soluble organic solvent that can be used to adjust viscosity include alcohols (for example, methanol, ethanol, propanol, isopropanol, butanol, isobutanol, sec-butanol, t-butanol, pentanol, hexanol, cyclohexanol and benzyl alcohol), polyhydric alcohols (for example, ethylene glycol, diethylene glycol, triethylene glycol, polyethylene glycol, propylene glycol, dipropylene glycol, polypropylene glycol, butylene glycol, hexanediol, pentanediol, glycerin, hexanetriol and thiodiglycol), glycol compounds (for example, ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether and ethylene glycol monophenyl ether), amines (for example, ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine and tetramethylpropylene diamine), and other polar solvents (for example, formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile and acetone).

The water-soluble organic solvents may be used alone or in a combination of two or more of them.

—Other Additives—

The ink composition according to the invention may include other additives as necessary, in addition to the essential components. Examples of the other additives include known additives such as a color fading inhibitor, an emulsion stabilizer, a penetration accelerating agent, an ultraviolet absorber, a preservative, a mildew-proofing agent, a pH regulator, a surface tension regulator, a defoamer, a viscosity regulator, a dispersant, a dispersion stabilizer, a water-repellant, and a chelating agent. These various additives may be added directly after the preparation of the ink composition, or may also be added during the preparation of the ink composition.

The ultraviolet absorber is used for the purpose of improving storability of an image. As the ultraviolet absorber, benzotriazole compounds described in, for example, JP-A Nos. 58-185677, 61-190537, 2-782, 5-197075 and 9-34057; benzophenone compounds described in, for example, JP-A Nos. 46-2784 and 5-194483, and U.S. Pat. No. 3,214,463; cinnamic acid compounds described in, for example, JP-B Nos.

48-30492 and 56-21141, and JP-A No. 10-88106; triazine compounds described in, for example, JP-A Nos. 4-298503, 8-53427, 8-239368 and 10-182621, and Japanese National Phase Publication No. 8-501291; compounds described in Research Disclosure No. 24239; and compounds that absorb ultraviolet light and emit fluorescence, i.e., fluorescent brighteners, represented by stilbene compounds or benzoxazole compounds may be used.

The color fading inhibitor is used for the purpose of improving storability of an image. Examples of the color fading inhibitor that can be used include various organic color fading inhibitors and metal complex color fading inhibitors. Examples of the organic color fading inhibitor include hydroquinones, alkoxyphenols, dialkoxyphenols, phenols, anilines, amines, indanes, chromanes, alkoxyanilines and heterocycles. Examples of the metal complex color fading inhibitor include a nickel complex and a zinc complex. More specifically, compounds described in the patents cited in Research Disclosure No. 17643, chapter VII, items I to J; Research Disclosure No. 15162: Research Disclosure No. 18716, page 650, the left-hand column; Research Disclosure No. 36544, page 527; Research Disclosure No. 307105, page 872; and Research Disclosure No. 15162, and compounds included in the formulae of the representative compounds and the exemplified compounds described on pages 127 to 137 of JP-A No. 62-215272 can be used.

Examples of the mildew-proofing agent include sodium dehydroacetate, sodium benzoate, sodium pyridinethiol-1-oxide, p-hydroxybenzoic acid ethyl ester, 1,2-benzisothiazolin-3-one and its salt. Those are preferably used in the water-based ink composition in an amount of from 0.02 mass % to 1.00 mass %.

As the pH regulator, a neutralizer (organic base and inorganic alkali) may be used. The pH regulator may be added in an amount such that the ink composition has the pH of preferably from 6 to 10, and more preferably from 7 to 10, for the purpose of improving storage stability of the water-based ink composition.

Examples of the surface tension regulator include nonionic surfactants, cationic surfactants, anionic surfactants and betaine surfactants.

The surface tension regulator is added in an amount such that the surface tension of the water-based ink composition is adjusted to preferably from 20 mN/m to 60 mN/m, more preferably from 20 mN/m to 45 mN/m, and further preferably from 25 mN/m to 40 mN/m, in order to well eject the water-based ink composition by an inkjet method. The surface tension of the ink composition can be measured using, for example, a plate method.

Specific examples of the surfactant as a hydrocarbon type preferably include anionic surfactants such as fatty acid salts, alkyl sulfate ester salts, alkyl benzene sulfonates, alkyl naphthalene sulfonates, dialkyl sulfosuccinates, alkyl phosphate ester salts, naphthalenesulfonic acid-formalin condensates and polyoxyethylene alkyl sulfate ester salts; and nonionic surfactants such as polyoxyethylene alkyl ether, polyoxyethylene alkyl allyl ether, polyoxyethylene fatty acid ester, sorbitan fatty acid ester, polyoxyethylene sorbitan fatty acid ester, polyoxyethylene alkyl amine, glycerin fatty acid ester and oxyethylene oxypropylene block copolymer. SURFYNOLS (trade name, products of Air Products & Chemicals) which are acetylene type polyoxyethylene oxide surfactants are preferably used. Furthermore, amine oxide type amphoteric surfactants such as N,N-dimethyl-N-alkyl amine oxide are preferred.

Additionally, materials described on pages (37) and (38) of JP-A No. 59-157636 and Research Disclosure No. 308119 (1989) as surfactants can be used.

When fluorocarbon (alkyl fluoride type) surfactants, silicone surfactants and the like, such as those described in JP-A Nos. 2003-322926, 2004-325707 and 2004-309806 are used, scratch resistance can be improved.

The surface tension regulator can be used also as a defoamer, and fluorine compounds, silicone compounds, chelating agents represented by EDTA, and the like can be used. When the ink is applied by an inkjet method, the ink composition of the invention has a viscosity preferably in a range of from 1 mPa·s to 30 mPa·s, more preferably in a range of from 1 mPa·s to 20 mPa·s, further preferably in a range of from 2 mPa·s to 15 mPa·s, and particularly preferably in a range of from 2 mPa·s to 10 mPa·s, from the standpoints of droplet ejection stability and rate of aggregation.

When the ink is applied by a method other than an inkjet method, the viscosity is preferably in a range of from 1 mPa·s to 40 mPa·s, and more preferably in a range of from 5 mPa·s to 20 mPa·s.

The viscosity of the water-based ink composition can be measured using, for example, a Brookfield viscometer.

[Reactive Liquid]

The ink set for inkjet recording of the invention includes at least one reactive liquid which forms aggregates by contacting with the ink composition described above. When the reactive liquid and the ink composition are brought into contact, the formation of ink aggregates may be rapidly carried out.

The pH of the reactive liquid (hereinafter, may also be referred to as "treating liquid") according to the invention is preferably 1 to 6, from the viewpoint of the rate of aggregation of the ink composition. The treating liquid according to the invention may be constituted to include at least one acidic compound. As the acidic compound, a compound having a phosphoric acid group, a phosphonic acid group, a phosphinic acid group, a sulfuric acid group, a sulfonic acid group, a sulfinic acid group or a carboxy group, or a salt thereof may be used. Among them, from the viewpoint of the rate of aggregation of the water-based ink composition, a compound having a phosphoric acid group or a carboxy group is preferred, and a compound having a carboxy group is more preferred.

The compound having a carboxy group according to the invention is preferably selected from polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidonecarboxylic acid, pyronecarboxylic acid, pyrrolecarboxylic acid, furancarboxylic acid, pyridinecarboxylic acid, coumalic acid, thiophenecarboxylic acid, and nicotinic acid, or derivatives of these compounds, or salts thereof. These compounds may be used alone, or may also be used in combination of two or more of them.

The treating liquid according to the invention may be constituted to further include a water-based solvent (for example, water), in addition to the acidic compound.

The content of the acidic compound in the treating liquid is preferably 5 mass % to 95 mass %, and more preferably 10 mass % to 80 mass %, relative to the total mass of the treating liquid, from the viewpoint of the effect of aggregation.

Furthermore, as a preferable example of the reactive liquid capable of enhancing rapid aggregation properties, which may be used in the invention, a reactive liquid added with a polyvalent metal salt or a polyallylamine may be mentioned. As the component of the liquid composition, there may be mentioned the alkaline earth metals belonging to Group 2A of the Periodic Table (for example, magnesium and calcium); the transition metals belonging to Group 3B of the Periodic Table (for example, lanthanum); the cations from the elements belonging to Group 3A of the Periodic Table (for example, aluminum); lanthanides (for example, neodymium); polyallylamine, and polyallylamine derivatives. Preferred examples include calcium and magnesium. As the anion which may be preferably employed as the counterion of calcium or magnesium, carboxylic acid salts (salts of formic acid, acetic acid, benzoic acid, and the like), nitrate, chloride and thiocyanate may be mentioned. In regard to the amount of addition to the treating liquid, the salt may be incorporated into the treating liquid in an amount in the range of about 1 mass % to about 10 mass %, preferably about 1.5 mass % to about 7 mass %, and more preferably about 2 mass % to about 6 mass %.

The treating liquid may also contain other additives, within the scope of not impairing the effects of the invention. Examples of the other additives include known additives such as a drying inhibitor (wetting agent), a color fading inhibitor, an emulsion stabilizer, a penetration accelerating agent, an ultraviolet absorber, a preservative, a mildew-proofing agent, a pH regulator, a surface tension regulator, a defoamer, a viscosity regulator, a dispersant, a dispersion stabilizer, a water-repellant, and a chelating agent, and those mentioned as the specific examples of the other additives included in the above-described water-based ink composition may be applied.

The viscosity of the treating liquid according to the invention is preferably in the range of 1 mPa·s to 30 mPa·s, more preferably in the range of 1 mPa·s to 20 mPa·s, even more preferably in the range of 2 mPa·s to 15 mPa·s, and particularly preferably in the range of 2 mPa·s to 10 mPa·s, from the viewpoint of the rate of aggregation of the ink composition.

The surface tension of the treating liquid is preferably 20 mN/m to 60 mN/m, and more preferably 20 mN/m to 45 mN/m, from the viewpoint of the rate of aggregation of the ink composition.

<Image Recording Method>

The image recording method of the invention is characterized by using the ink set for inkjet recording described above. By using the ink composition and the reactive liquid, rapid image recording that has never been achieved may be achieved.

The image recording method of the invention preferably includes a reactive liquid supplying process of supplying a reactive liquid onto a recording medium, and an aggregate forming process of contacting the reactive liquid with an ink composition to form aggregates. Thereby, rapid formation of aggregates and satisfactory ink fixability may be realized.

[Reactive Liquid Supplying Process]

As the method of supplying a reactive liquid onto a recording medium, a known liquid supplying method may be used without particular limitation. For example, supply by an inkjet method, supply by a coating roller, and the like may be mentioned.

The supply of a reactive liquid according to the invention may be carried out by a method of supplying the reactive liquid imagewise as will be recorded, or a method of supplying the reactive liquid to be plane-like on the recording medium.

The amount of the reactive liquid supplied is not particularly limited as long as aggregation of the ink composition is made possible, and the amount may be appropriately selected in accordance with the supplying method. For example, in the case of a reactive liquid containing an acidic compound, the amount may be selected such that the amount of the acidic compound is 0.3 g/m² or more, preferably 0.3 g/m² to 2 g/m², and more preferably 0.5 g/m² to 1 g/m², and as long as the amount of coating applied by supply by an inkjet method or a method of using a coating roller, is within the above-described range, the concentration of the reactive liquid and the amount of the reactive liquid coated may be appropriately selected.

[Aggregate Forming Process]

The aggregate forming process according to the invention is not particularly limited as long as it is a method based on an inkjet method capable of supplying an ink composition so that a reactive liquid and an ink composition supplied onto a recording medium are brought into contact to form aggregates.

The inkjet recording method includes any recording method involving ejecting an ink composition from fine nozzles as liquid droplets, and thereby attaching the liquid droplets to a recording medium. Specific examples of the inkjet recording method capable of utilizing the ink composition of the invention will be described below.

A first method is a method called an electrostatic suction method. The electrostatic suction method is a method of recording an image by applying a strong electric field between a nozzle and an accelerating electrode that is disposed anteriorly to the nozzle, continuously jetting ink from the nozzle in the form of liquid droplets, transmitting the printing information signals to deflection electrodes while the ink droplets pass between the defection electrodes, and thereby causing the ink droplets to fly toward the surface of the recording medium to fix the ink on the recording medium; or a method of recording an image by jetting ink droplets from nozzles toward the surface of a recording medium according to the printing information signals, without deflecting the ink droplets, and thereby fixing an image on the recording medium. The ink set of the invention may also be preferably utilized in a recording method based on this electrostatic suction method.

A second method is a method of forcibly jetting ink droplets from nozzles by applying pressure to the ink liquid with a small-size pump, and at the same time, mechanically vibrating the inkjet nozzles by means of a quartz oscillator or the like. This is a method of recording an image on a recording medium in which the ink droplets jetted from the nozzles are charged simultaneously with being jetted, and printing information signals are transmitted to deflection electrodes while these ink droplets pass between the deflection electrodes, so that the ink droplets are caused to fly toward the recording medium. The ink set of the invention may also be preferably utilized in this recording method.

A third method is a method of recording an image on a recording medium by simultaneously applying pressure and printing information signals to an ink liquid by a piezoelectric device to jet ink droplets from nozzles toward the recording medium (Piezo). The ink set of the invention may also be preferably utilized in this recording method.

A fourth method is a method of recording an image on a recording medium by heating and foaming an ink liquid using a microelectrode according to the print information signals, expanding this foam, and thereby jetting the ink liquid from nozzles toward the recording medium (BUBBLEJET (registered trademark)). The ink set of the invention may also be preferably utilized in this recording method.

The recording medium according to the invention is not particularly limited, and for example, ordinary paper, high quality papers, coated papers, and the like may be mentioned.

Recorded articles recorded using the ink set of the invention have excellent image quality, and also have excellent fixability.

EXAMPLES

Hereinafter, the present invention will be described more specifically by way of Examples. The scope of the invention is not intended to be limited to the specific examples presented below. Also, if not stated otherwise, the terms "parts" and "%" are on a mass basis.

Example 1

Preparation of Ink Composition

Preparation of Pigment Dispersion

Preparation of Water-Insoluble Polymer Dispersant

Preparation Examples 1 to 6

Synthesis of Water-Insoluble Polymer Dispersants 1 to 6

20 parts of the organic solvent shown in Table 1, the monomer (1) shown in Table 1 and a polymerization chain transfer agent were placed in a reaction vessel, and the air inside the reaction vessel was sufficiently substituted with nitrogen gas.

Next, the monomer (2) shown in Table 1, and a polymerization chain transfer agent, 60 parts of an organic solvent, and 1.2 parts of 2,2'-azobis(2,4-dimethylvaleronitrile) were placed in a dropping funnel, and the air inside the dropping funnel was sufficiently substituted with nitrogen gas. In a nitrogen atmosphere, the mixed solution in the reaction vessel was heated to 65° C. while stirring, and the mixed solution in the dropping funnel was slowly added thereto dropwise over 3 hours. After a lapse of two hours from the completion of dropwise addition, a solution prepared by dissolving 0.3 parts of 2,2'-azobis(2,4-dimethylvaleronitrile) in 5 parts of the organic solvent shown in Table 1 was added to the mixed solution, and the resulting mixture was aged for 2 hours at 65° C. and for 2 hours at 70° C., to thus obtain a solution of a copolymer of water-insoluble polymer dispersant.

The copolymer was isolated by drying a portion of the obtained copolymer solution for 2 hours at 105° C. under reduced pressure to thereby remove the solvent, and the weight average molecular weight of the copolymer was measured by gel permeation chromatography using chloroform containing dodecyldimethylamine at 1 mmol/L and using polystyrene as the standard material. The obtained results are shown in Table 1.

Five parts of the copolymer obtained by drying the resulting copolymer solution under reduced pressure, was dissolved in 25 parts of the organic solvent shown in Table 1, and a predetermined amount of the neutralizer (30% aqueous solution) shown in Table 1 was added to neutralize a portion of the copolymer.

The components in the following Table 1 are as follows.

Silicone macromer: trade name: FM-0711, manufactured by Chisso Corporation. (number average molecular weight: 1000, compound represented by formula (II-1a))

Styrene macromer A: trade name: AN-6, manufactured by Toagosei Co., Ltd. (styrene-acrylonitrile copolymer macromer, styrene content: 75 mass %, number average molecular weight: 6000, polymerizable functional group: methacryloyloxy group)

Styrene copolymer B: trade name: AS-6, manufactured by Toagosei Co., Ltd. (styrene homopolymer macromer, number average molecular weight: 6000, polymerizable functional group: methacryloyloxy group)

(Preparation of Cyan Dispersions C-01 to C-05)

Next, as described in Table 3, for each of the water-insoluble polymer dispersants 1 to 6 obtained above, 5.0 g according to solid content conversion, of a solution of the water-insoluble polymer dispersants, 10.0 g of a cyan pigment, Pigment Blue 15:3 (manufactured by Dainichiseika Color & Chemicals Manufacturing Co., Ltd.), 40.0 g of methyl ethyl ketone, 8.0 g of 1 mol/L sodium hydroxide, 82.0 g of ion exchanged water, and 300 g of 0.1-mm zirconia beads were supplied to a vessel, and the mixture was dispersed with a disperser (trade name: READY MILL, manufactured by Imex Co., Ltd.) at 1000 rpm for 6 hours. The resulting pigment dispersion was concentrated under reduced pressure with an evaporator until the methyl ethyl ketone could be sufficiently distilled off, and the pigment dispersion was concentrated until the pigment concentration reached about 12%.

Subsequently, the pigment dispersion was centrifuged at 8000 rpm for 30 minutes, to remove coarse large particles remaining as a precipitate. The absorbance of the supernatant was measured to determine the pigment concentration.

Thus, in the manner described above, each of the cyan dispersions was prepared as a coloring material. The average particle size and the particle size after a time lapse of the obtained cyan dispersions were as shown in Table 3.

(Preparation of Magenta Dispersions M-01 to M-05)

Each of the magenta dispersions was prepared in a similar manner to that in the preparation of the cyan dispersions, except that a magenta pigment, Pigment Red 122, was used instead of the cyan pigment, Pigment Blue 15:3. The average particle size and the particle size after a time lapse of the obtained magenta dispersions were as shown in Table 3.

(Preparation of Yellow Dispersions Y-01 to Y-05)

Each of the yellow dispersions was prepared in a similar manner to that in the preparation of the cyan dispersions, except that a yellow pigment, Pigment Yellow 74, was used instead of the cyan pigment, Pigment Blue 15:3, and the amount of addition of the water-insoluble polymer dispersant was changed to 4.0 g in terms of solid content. The average particle size and the particle size after a time lapse of the obtained yellow dispersions were as shown in Table 3.

(Preparation of Black Dispersions K-01 to K-05)

Each of the black dispersions was prepared in a similar manner to that in the preparation of the cyan dispersions, except that carbon black (trade name: NIPEX160-IQ, manufactured by Degussa, Inc.) was used instead of the cyan pigment, Pigment Blue 15:3, and the amount of addition of the water-insoluble polymer dispersant was changed to 3.0 g in terms of solid content. The average particle size and the particle size after a time lapse of the obtained black dispersions were as shown in Table 3.

TABLE 1

|  | Preparation Example 1 | | Preparation Example 2 | | Preparation Example 3 | |
| --- | --- | --- | --- | --- | --- | --- |
|  | Monomer (1) | Monomer (2) | Monomer (1) | Monomer (2) | Monomer (1) | Monomer (2) |
| t-Butyl methacrylate |  |  | 20 | 23 |  |  |
| n-Dodecyl methacrylate |  |  |  |  |  |  |
| Styrene | 20 | 25 |  |  | 20 | 23 |
| Acrylic acid |  |  |  |  |  |  |
| Methacrylic acid | 4 | 4 |  |  |  |  |
| Methyl methacrylate |  |  |  |  |  |  |
| N,N-Dimethylaminoethyl methacrylate |  |  | 20 | 20 |  |  |
| N,N-Dimethylaminoethyl acrylate |  |  |  |  | 2 | 3 |
| Methoxypolytetramethylene glycol (12) methacrylate |  |  |  |  |  |  |
| Butoxypolyethylene glycol (9) methacrylate | 10 | 15 |  |  |  |  |
| Methoxypolyethylene glycol (n) methacrylate |  |  | (n = 9) 5 | (n = 9) 5 | (n = 23) 20 | (n = 23) 20 |
| 2-Hydroxyethyl methacrylate |  |  |  |  |  |  |
| Silicone macromer | 5 | 5 | 2 | 3 |  |  |
| Styrene macromer A |  |  |  |  | 5 | 5 |
| Styrene macromer B | 5 | 5 |  |  |  |  |
| n-Dodecylmercaptan | 0.3 | 1.7 | 0.2 | 1.8 |  |  |
| Mercaptoethanol |  |  |  |  | 0.2 | 1.8 |
| Weight average molecular weight | 38000 | | 24000 | | 21000 | |
| Organic solvent | Acetone | | Methyl ethyl ketone | | Methyl ethyl ketone | |
| Neutralizer | Ammonia: 0.3 | | Glycolic acid: 3.2 | | Acetic acid: 0.4 | |
|  | Preparation Example 4 | | Preparation Example 5 | | Preparation Example 6 | |
|  | Monomer (1) | Monomer (2) | Monomer (1) | Monomer (2) | Monomer (1) | Monomer (2) |
| t-Butyl methacrylate |  |  |  |  |  |  |
| n-Dodecyl methacrylate | 3 | 5 |  |  |  |  |
| Styrene | 7.5 | 7.5 | 8 | 10 | 15 | 15 |
| Acrylic acid |  |  |  |  |  |  |
| Methacrylic acid |  |  |  |  |  |  |
| Methyl methacrylate |  |  |  |  | 4.5 | 4.5 |
| N,N-Dimethylaminoethyl methacrylate | 10 | 15 | 15 | 15 | 25 | 25 |
| N,N-Dimethylaminoethyl acrylate |  |  |  |  |  |  |
| Methoxypolytetramethylene glycol (12) methacrylate |  |  |  |  |  |  |
| Butoxypolyethylene glycol (9) methacrylate |  |  |  |  |  |  |
| Methoxypolyethylene glycol (n) methacrylate | (n = 4) 20 | (n = 4) 20 | (n = 4) 15 | (n = 4) 18 |  |  |
| 2-Hydroxyethyl methacrylate |  |  | 2 | 3 |  |  |
| Silicone macromer |  |  | 1 | 1 |  |  |
| Styrene macromer A |  |  |  |  |  |  |
| Styrene macromer B | 5 | 5 | 5 | 5 | 5 | 5 |
| n-Dodecylmercaptan |  |  |  |  |  |  |
| Mercaptoethanol | 0.2 | 1.8 | 0.2 | 1.8 | 0.2 | 0.8 |
| Weight average molecular weight | 15000 | | 43000 | | 37000 | |
| Organic solvent | Methyl ethyl ketone | | Methyl ethyl ketone | | Methyl ethyl ketone | |
| Neutralizer | Gluconic acid: 5.2 | | Glyceric acid: 2.9 | | Gluconic acid: 10.4 | |

(unit: parts by mass)

Preparation of Self-Dispersing polymer

Synthesis Example 1

360.0 g of methyl ethyl ketone was charged in a 2 L three-necked flask equipped with a stirrer, a thermometer, a reflux condenser tube, and a nitrogen gas introduction pipe, and the temperature was increased to 75° C. A mixed solution containing 180.0 g of phenoxy ethyl acrylate, 162.0 g of methyl methacrylate, 18.0 g of acrylic acid, 72 g of methyl ethyl ketone, and 1.44 g of a polymerization initiator (trade name: V-601, manufactured by Wako Pure Chemical Ind. Ltd.) was added dropwise with a constant rate in such a manner that the addition was completed in 2 hours while maintaining the temperature inside the reaction vessel at 75° C. After the completion of the dropwise addition, a solution containing 0.72 g of V-601 (described above) and 36.0 g of methyl ethyl ketone was added. The mixture was stirred at 75° C., for 2 hours and then a solution containing 0.72 g of V-601 (described above) and 36.0 g of methyl ethyl ketone was further added. Then, the mixture was stirred at 75° C. for 2 hours, the temperature was increased to 85° C., and the mixture was further stirred for 2 hours. The weight average molecular weight (Mw) of the obtained copolymer was 64,000 (calculated with gel permeation chromatography (GPC) in terms of polystyrene, used columns: TSKgel SuperHZM-H, TSKgel SuperHZ4000, and TSKgel SuperHZ200 (trade names, manufactured by TOSOH CORP.), and the acid value thereof was 38.9 (mgKOH/g).

Next, 668.3 g of the polymerization solution was weighed out, then 388.3 g of isopropanol and 145.7 ml of 1 mol/L NaOH aqueous solution were added thereto, and the temperature inside the reaction vessel was increased to 80° C. Further, 720.1 g of distilled water was added thereto dropwise at a rate of 20 ml/min so as to disperse the resultant in water. Thereafter, the temperature inside the reaction vessel was maintained at 80° C. for 2 hours, then maintained at 85° C. for 2 hours, and further maintained at 90° C. for 2 hours under an atmospheric pressure. Thereafter, the pressure of the inside of the reaction vessel was reduced to distill off isopropanol, methyl ethyl ketone, and distilled water, in a total amount of 913.7 g, to obtain a water-based dispersion (emulsion) of a self-dispersing polymer (B-01) having a solid content of 28.0%. The number of each structural unit in the structural formula of the exemplified self-dispersing polymer (B-01) shown below indicates a mass ratio. Hereinafter, the same applies to each structural formula.

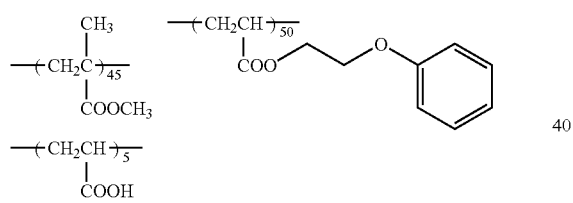

(B-01)

Synthesis Example 2

Dispersions of the following self-dispersing polymer particles (B-02) to (B-05) and (B-15) to (B-19) were respectively obtained in a similar manner to that in the Synthesis Example 1, except that the type and the mixing amount of each monomer used were changed such that the respective structural units of the following compound examples would be at the mass ratios given below for the respective structural formulas, instead of 180.0 g of phenoxyethyl acrylate, 162.0 g of methyl methacrylate and 18.0 g of acrylic acid, which were used in the synthesis of the compound example (B-01) of the Synthesis Example 1.

The physical properties of the obtained compound examples (B-02) to (B-05) and (B-15) to (B-19) are shown in Table 2. In addition, in regard to all of the degree of neutralization of the self-dispersing polymers, the amount of the 1 mol/L aqueous solution of NaOH was adjusted so that the degree of neutralization would be 0.75 molar equivalent relative to 1 mole of the dissociable group.

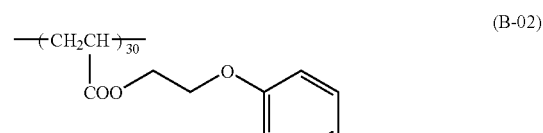

(B-02)

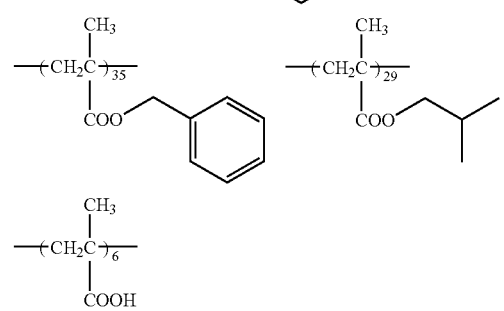

(B-03)

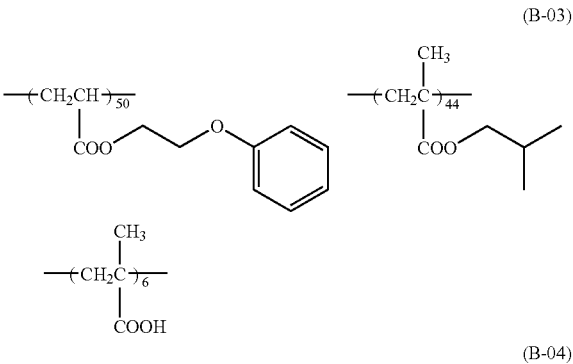

(B-04)

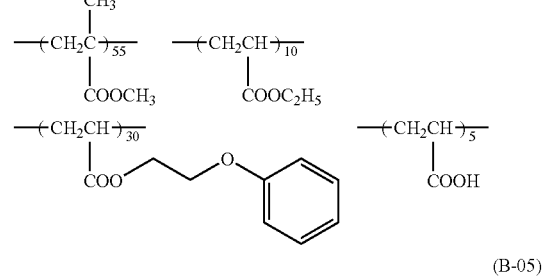

(B-05)

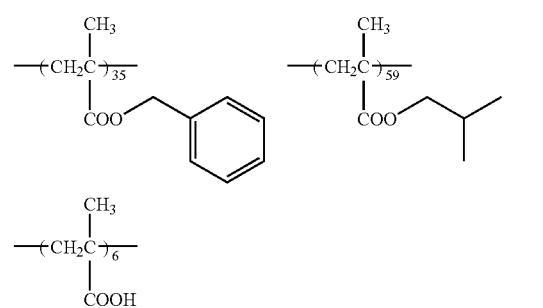

(B-15)

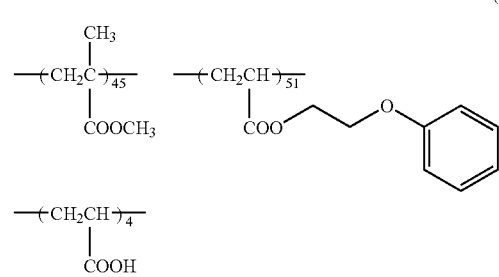

-continued (B-16)
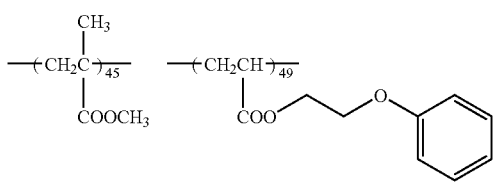

(B-17)

(B-18)
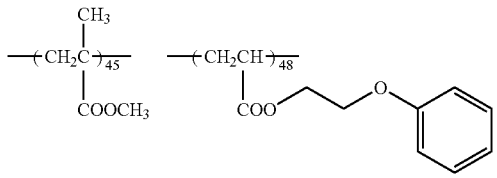

(B-19)
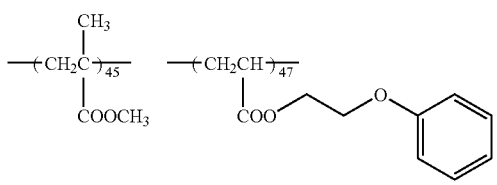

Furthermore, polymer fine particles having the following structural formulas, in which the amount of acrylic acid was changed to 3% (acid value: 23) or 15% (acid value: 117), were produced, but these polymer fine particles were not capable of self-dispersing.

(BH-10)
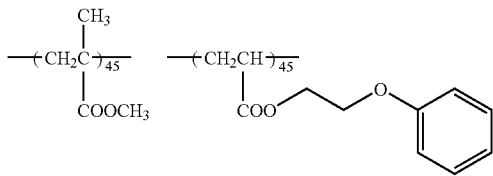

-continued (BH-11)
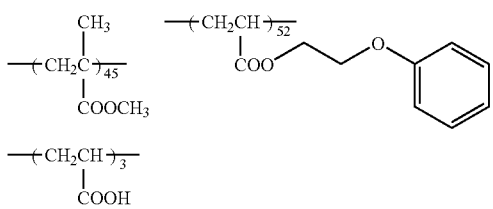

[Preparation of Polymer Fine Particles by Emulsion Polymerization]

8.1 g of an emulsifier (trade name: PIONIN A-43s, manufactured by Takemoto Oil & Fat Co., Ltd.) and 236.0 g of distilled water were charged in a 1-liter three-necked flask equipped with a stirrer and a reflux condenser tube, and the mixture was heated and stirred at 70° C. under a nitrogen gas stream. 6.2 g of styrene, 3.5 g of n-butyl acrylate, 0.3 g of acrylic acid, 1.0 g of ammonium persulfate, and 40 g of distilled water were added thereto, and the resulting mixture was stirred for 30 minutes. Then, a monomer solution containing 117.8 g of styrene, 66.5 g of butyl acrylate and 5.7 g of acrylic acid was added thereto dropwise at a constant rate such that the dropwise addition would be completed in 2 hours. After completion of the dropwise addition, an aqueous solution containing 0.5 g of ammonium persulfate and 20 g of distilled water was added thereto, and the resulting mixture was stirred for 4 hours at 70° C. Subsequently, the temperature was raised to 85° C., and the mixture was further stirred for additional 2 hours. The reaction liquid was cooled and filtered, and thereby a dispersion of polymer fine particles represented by the following compound example (BH-1) was obtained. The physical properties of the obtained polymer fine particles are shown in Table 2.

(BH-1)
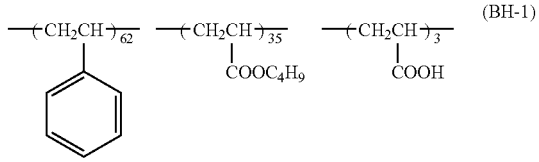

TABLE 2

|  | Weight average molecular weight | Acid value (mg KOH/g) | Particle size (nm) |
|---|---|---|---|
| B-01 | 64,000 | 39 | 30 |
| B-02 | 58,000 | 39 | 32 |
| B-03 | 65,000 | 39 | 40 |
| B-04 | 52,000 | 39 | 35 |
| B-05 | 44,000 | 39 | 45 |
| B-15 | 65,000 | 31 | 30 |
| B-16 | 69,000 | 47 | 23 |
| B-17 | 68,000 | 55 | 21 |
| B-18 | 72,000 | 62 | 15 |
| B-19 | 69,000 | 78 | 10 |
| BH-1 | 232,000 | 23 | 70 |

[Preparation of Ink Composition]

Ink compositions were prepared using the above-obtained pigment dispersions and self-dispersing polymer particles as shown in Table 3, by mixing the respective components to obtain the following ink compositions. Each of the prepared ink compositions was filled in a plastic disposable syringe and filtered through a 5-μm PVDF filter (trade name: MILLEX-SV, manufactured by Millipore Corp., diameter: 25 mm), to obtain a finished ink.

| (Composition of ink C-01) | |
|---|---|
| Cyan pigment (Pigment Blue 15:3) | 4% |
| Water-insoluble polymer dispersant (see Table 3) | 2% |
| Self-dispersing polymer particles (see Table 3) | 8% |
| SUNNIX GP250 (trade name, manufactured by Sanyo Chemical Industries, Ltd., water-soluble organic solvent) | 10% |
| Diethylene glycol monoethyl ether (manufactured by Wako Pure Chemical Industries, Ltd., water-soluble organic solvent) | 5% |
| ORFIN E1010 (trade name, manufactured by Nisshin Chemical Co., Ltd., surfactant) | 1% |
| Ion exchanged water | 70% |

| (Composition of ink M-01) | |
|---|---|
| Magenta pigment (Pigment Red 122) | 4% |
| Water-insoluble polymer dispersant (see Table 3) | 2% |
| Self-dispersing polymer particles (see Table 3) | 8% |
| Glycerin (manufactured by Wako Pure Chemical Industries, Ltd., water-soluble organic solvent) | 20% |
| Diethylene glycol (manufactured by Wako Pure Chemical Industries, Ltd., water-soluble organic solvent) | 10% |
| ORFIN E1010 (trade name, manufactured by Nisshin Chemical Co., Ltd., surfactant) | 1% |
| Ion exchanged water | 55% |

| (Composition of ink Y-01) | |
|---|---|
| Yellow pigment (Pigment Yellow 74) | 4% |
| Water-insoluble polymer dispersant (see Table 3) | 1.6% |
| Self-dispersing polymer particles (see Table 3) | 8% |
| SUNNIX GP250 (trade name, manufactured by Sanyo Chemical Industries, Ltd., water-soluble organic solvent) | 10% |
| Diethylene glycol monoethyl ether (manufactured by Wako Pure Chemical Industries, Ltd., water-soluble organic solvent) | 5% |
| ORFIN E1010 (trade name, manufactured by Nisshin Chemical Co., Ltd., surfactant) | 1% |
| Ion exchanged water | 54.6% |

| (Composition of ink K-01) | |
|---|---|
| Carbon black | 4% |
| Water-insoluble polymer dispersant (see Table 3) | 1.2% |
| Self-dispersing polymer particles (see Table 3) | 8% |
| SUNNIX GP250 (trade name, manufactured by Sanyo Chemical Industries, Ltd., water-soluble organic solvent) | 10% |
| Diethylene glycol monoethyl ether (manufactured by Wako Pure Chemical Industries, Ltd., water-soluble organic solvent) | 5% |
| ORFIN E1010 (trade name, manufactured by Nisshin Chemical Co., Ltd., surfactant) | 1% |
| Ion exchanged water | 54.2% |

(Preparation of inks C-02 to C-05, M-02 to M-05, Y-02 to Y-05, and K-02 to K-05)

The inks were each prepared in a similar manner to that in the preparation of the ink C-01, M-01, Y-01 or K-01, except that the pigment dispersant and the polymer fine particles were changed as shown in Table 3.

The property values of each of the inks obtained as described are shown in the following Table 3. In Table 3, the respective physical property values were measured as follows.

The surface tension was measured at 25° C. using a surface tensiometer (trade name: CBVP-Z, manufactured by Kyowa Interface Science Co., Ltd.) according to the Wilhelmy method using a platinum plate.

The viscosity was measured at 25° C. with viscometer (trade name: DV-II+, manufactured by Brookfield Engineering Laboratories, Inc.) using a cone and a plate (1° 34, φ 35 mm), and using the ink in the form of stock solution in a liquid amount of 0.5 mL. The average value of data obtained at a torque in the range of 20% to 95% and a speed of rotation in the range of 10 rpm to 100 rpm was taken as the measurement value.

The pH was measured at 25° C. using a pH meter (trade name: WM-50EG, manufactured by DKK-Toa Corporation) and using the ink composition in the form of stock solution.

The particle size was measured using a NanoTrack particle size distribution analyzer (trade name: UPA-EX150, manufactured by Nikkiso Co., Ltd.), with the ink composition diluted with ion exchanged water such that its content was reduced to 1/50 to 1/1000, and the particle size was determined as a volume average particle size Mv measured under the conditions of particle transparency: transparent, particle shape: non-spherical, particle density: 1.2, and 25° C.

The particle size after a time lapse was measured in a similar manner to that in the case of the particle size, after the ink composition was allowed to stand in a sealed state at 58° C. for 15 days.

TABLE 3

| Ink composition | Pigment dispersion | Pigment | Water-insoluble polymer dispersant (pigment dispersant) | Polymer fine particles Self-dispersing | Polymer fine particles Emulsion polymerized | Pigment dispersion Particle size (nm) | Particle size after time lapse (nm) | Note |
|---|---|---|---|---|---|---|---|---|
| C-01 | C-01 | Cyan | Preparation Example 1 | B-01 | | 78.5 | 80.1 | Present invention |
| C-02 | C-02 | Cyan | Preparation Example 1 | | BH-1 | 78.5 | 80.1 | Comparison |
| C-03 | C-03 | Cyan | Preparation Example 2 | B-01 | | 81.2 | 86.1 | Comparison |
| C-04 | C-04 | Cyan | Preparation Example 2 | | BH-1 | 81.2 | 86.1 | Comparison |
| C-05 | C-05 | Cyan | Preparation Example 5 | B-02 | | 77.5 | 79.1 | Present invention |
| M-01 | M-01 | Magenta | Preparation Example 3 | B-03 | | 65.4 | 67.2 | Present invention |
| M-02 | M-02 | Magenta | Preparation Example 3 | | BH-1 | 65.4 | 67.2 | Comparison |
| M-03 | M-03 | Magenta | Preparation Example 2 | B-03 | | 69.2 | 74.2 | Comparison |
| M-04 | M-04 | Magenta | Preparation Example 2 | | BH-1 | 69.2 | 74.2 | Comparison |
| M-05 | M-05 | Magenta | Preparation Example 5 | B-04 | | 64.3 | 66.2 | Present invention |
| Y-01 | Y-01 | Yellow | Preparation Example 4 | B-05 | | 80.5 | 81.5 | Present invention |
| Y-02 | Y-02 | Yellow | Preparation Example 4 | | BH-1 | 80.5 | 81.5 | Comparison |
| Y-03 | Y-03 | Yellow | Preparation Example 2 | B-05 | | 82.1 | 85.5 | Comparison |
| Y-04 | Y-04 | Yellow | Preparation Example 2 | | BH-1 | 82.1 | 85.5 | Comparison |
| Y-05 | Y-05 | Yellow | Preparation Example 5 | B-15 | | 81.1 | 82.1 | Present invention |
| K-01 | K-01 | Black | Preparation Example 6 | B-16 | | 146.2 | 148.2 | Present invention |
| K-02 | K-02 | Black | Preparation Example 6 | | BH-1 | 146.2 | 148.2 | Comparison |
| K-03 | K-03 | Black | Preparation Example 2 | B-16 | | 147.8 | 162.1 | Comparison |
| K-04 | K-04 | Black | Preparation Example 2 | | BH-1 | 147.8 | 162.1 | Comparison |
| K-05 | K-05 | Black | Preparation Example 5 | B-18 | | 143.2 | 145.1 | Present invention |

| Ink composition | Pigment dispersion | Pigment | Water-insoluble polymer dispersant (pigment dispersant) | Viscosity [mPa·s] | Surface tension [mN/m] | pH | Particle size (nm) | Particle size after time lapse (nm) | Note |
|---|---|---|---|---|---|---|---|---|---|
| C-01 | C-01 | Cyan | Preparation Example 1 | 4.2 | 35.4 | 8.8 | 83.2 | 84.3 | Present invention |
| C-02 | C-02 | Cyan | Preparation Example 1 | 4.6 | 32.1 | 8.8 | 81.8 | 81.9 | Comparison |
| C-03 | C-03 | Cyan | Preparation Example 2 | 4.3 | 35.4 | 8.7 | 80.5 | 121.2 | Comparison |
| C-04 | C-04 | Cyan | Preparation Example 2 | 4.6 | 32.1 | 8.7 | 83.5 | 136.2 | Comparison |
| C-05 | C-05 | Cyan | Preparation Example 5 | 4.5 | 36.2 | 8.6 | 82.5 | 83.8 | Present invention |
| M-01 | M-01 | Magenta | Preparation Example 3 | 4.3 | 35.8 | 8.8 | 67.5 | 68.2 | Present invention |
| M-02 | M-02 | Magenta | Preparation Example 3 | 4.6 | 32.1 | 8.8 | 68.2 | 69.4 | Comparison |
| M-03 | M-03 | Magenta | Preparation Example 2 | 4.5 | 35.8 | 8.7 | 69.6 | 106.5 | Comparison |
| M-04 | M-04 | Magenta | Preparation Example 2 | 4.6 | 32.1 | 8.7 | 68.7 | 103.4 | Comparison |
| M-05 | M-05 | Magenta | Preparation Example 5 | 4.4 | 36.0 | 8.6 | 67.8 | 69.2 | Present invention |
| Y-01 | Y-01 | Yellow | Preparation Example 4 | 4.3 | 35.7 | 8.8 | 82.3 | 83.1 | Present invention |
| Y-02 | Y-02 | Yellow | Preparation Example 4 | 4.6 | 32.1 | 8.8 | 83.5 | 82.5 | Comparison |
| Y-03 | Y-03 | Yellow | Preparation Example 2 | 4.4 | 35.7 | 8.7 | 82.6 | 125.3 | Comparison |
| Y-04 | Y-04 | Yellow | Preparation Example 2 | 4.6 | 32.1 | 8.7 | 84.5 | 138.2 | Comparison |
| Y-05 | Y-05 | Yellow | Preparation Example 5 | 4.5 | 35.9 | 8.6 | 84.1 | 84.5 | Present invention |
| K-01 | K-01 | Black | Preparation Example 6 | 4.8 | 35.4 | 8.8 | 159.2 | 158.3 | Present invention |
| K-02 | K-02 | Black | Preparation Example 6 | 4.6 | 32.1 | 8.8 | 147.5 | 148.5 | Comparison |
| K-03 | K-03 | Black | Preparation Example 2 | 4.7 | 35.4 | 8.7 | 150.5 | 213.5 | Comparison |
| K-04 | K-04 | Black | Preparation Example 2 | 4.6 | 32.1 | 8.7 | 158.2 | 250.6 | Comparison |
| K-05 | K-05 | Black | Preparation Example 5 | 4.8 | 35.2 | 8.6 | 151.3 | 152.1 | Present invention |

[Preparation of Reactive Liquid]

A reactive liquid was prepared by mixing the respective components to obtain the following composition.

(Composition of reactive liquid)

| | |
|---|---|
| Citric acid (manufactured by Wako Pure Chemical Industries, Ltd.) | 16.7% |
| Diethylene glycol monomethyl ether (manufactured by Wako Pure Chemical Industries, Ltd.) | 20.0% |
| ZONYL FSN-100 (trade name, manufactured by DuPont Company) | 1.0% |
| Ion exchanged water | 62.3% |

The physical property values of the reactive liquid were measured, and the reactive liquid was found to have a viscosity of 4.9 mPa·s, a surface tension of 24.3 mN/m, and a pH of 1.5.

<Evaluation of Ink Set for Inkjet Recording>

The ink composition and reactive liquid obtained as described above were used to perform the following evaluation.

1. Evaluation of Dot Diameter

The reactive liquid (treating liquid) was applied on a TOKUBISHI ART double-sided N paper (84.9 g/m² product) (trade name, manufactured by Mitsubishi Paper Mills, Ltd.), using a wire bar coater to obtain a thickness of about 5 μm (amount of citric acid 0.84 g/m²). Subsequently, the coated paper was dried by dry air at 80° C. for 15 seconds. Immediately thereafter, a first droplet of ink was ejected thereon at an ejection amount of 3.5 pL using an inkjet printer which was a modified product of GELJET GX5000 printer (trade name, manufactured by Ricoh Company, Ltd.), to thus form a dot.

The image obtained by ejecting the ink using this modified printer was analyzed with a dot analyzer (manufactured by Oji Scientific Instruments), and thus the primary dot diameter was measured.

Furthermore, a sample was produced in a similar manner except that a first drop of ink was ejected, and after 5 msec, a second drop of ink was ejected such that the two dots were overlapping over about half the area. The sample was analyzed with the aforementioned dot analyzer, and thus the secondary dot diameter was measured.

<Evaluation Criteria>

A: The primary and secondary dot diameters are each less than 35 μm, and the difference between the primary dot diameter and the secondary dot diameter is less than 2.5 μm.

D: The primary and secondary dot diameters are each 35 μm or more, or the difference between the primary dot diameter and the secondary dot diameter was 2.5 μm or more.

2. Evaluation of Accuracy of Spotting Position

A line image was drawn at 75 dpi×2400 dpi, using IPSIO GX5000 (trade name, manufactured by Ricoh Company, Ltd.) using 96 nozzles and at an ejection frequency of 12 kHz.

The central value of the lines was measured with a dot analyzer (trade name: DA-6000, manufactured by Oji Scientific Instruments), and the standard error σ of the shift length of each line was calculated.

<Evaluation Criteria>
a: σ<2 μm
b: 2 μm≦σ<3 μm
c: 3 μm≦σ<6 μm
d: 6 μm≦σ

TABLE 4

| Ink composition for primary color | Ink composition for secondary color | Dot diameter of primary color (μm) | Dot diameter of secondary color (μm) | Evaluation of dot diameter | Accuracy of spotting position | Note |
|---|---|---|---|---|---|---|
| C-01 | M-01 | 31.6 | 32.6 | A | a | Present invention |
| C-01 | M-02 | 31.6 | 46.7 | D | b | Comparison |
| C-01 | M-03 | 31.6 | 34.5 | D | c | Comparison |
| C-01 | M-04 | 31.6 | 48.5 | D | d | Comparison |
| C-01 | M-05 | 31.6 | 33.2 | A | a | Present invention |
| C-02 | M-01 | 50.3 | 50.8 | D | a | Comparison |
| C-02 | M-02 | 50.3 | 65.2 | D | b | Comparison |
| C-02 | M-03 | 50.3 | 50.5 | D | c | Comparison |
| C-02 | M-04 | 50.3 | 68.2 | D | d | Comparison |
| C-03 | M-01 | 29.5 | 33.5 | D | c | Comparison |
| C-03 | M-02 | 29.5 | 48.2 | D | c | Comparison |
| C-03 | M-03 | 29.5 | 35.6 | D | c | Comparison |
| C-03 | M-04 | 29.5 | 49.2 | D | d | Comparison |
| C-04 | M-01 | 56.8 | 57.3 | D | d | Comparison |
| C-04 | M-02 | 56.8 | 72.1 | D | d | Comparison |
| C-04 | M-03 | 56.8 | 57.5 | D | d | Comparison |
| C-04 | M-04 | 56.8 | 69.5 | D | d | Comparison |
| C-05 | M-01 | 32.1 | 33.1 | A | a | Present invention |
| C-05 | M-05 | 32.1 | 33.5 | A | a | Present invention |
| C-05 | Y-01 | 32.1 | 34.2 | A | a | Present invention |
| C-05 | Y-05 | 32.1 | 33.8 | A | a | Present invention |
| Y-01 | K-01 | 30.8 | 33.2 | A | b | Present invention |
| Y-01 | K-02 | 30.8 | 45.3 | D | c | Comparison |
| Y-01 | K-03 | 30.8 | 33.8 | D | c | Comparison |
| Y-01 | K-04 | 30.8 | 47.8 | D | d | Comparison |
| Y-01 | K-05 | 30.3 | 31.5 | A | a | Present invention |
| Y-02 | K-01 | 52.1 | 52.6 | D | b | Comparison |
| Y-02 | K-02 | 52.1 | 69.2 | D | c | Comparison |
| Y-02 | K-03 | 52.1 | 53.2 | D | c | Comparison |
| Y-02 | K-04 | 52.1 | 71.1 | D | d | Comparison |
| Y-03 | K-01 | 31.3 | 34.1 | D | d | Comparison |
| Y-03 | K-02 | 31.3 | 47.2 | D | d | Comparison |
| Y-03 | K-03 | 31.3 | 34.3 | D | c | Comparison |
| Y-03 | K-04 | 31.3 | 48.2 | D | d | Comparison |
| Y-04 | K-01 | 62.1 | 62.5 | D | d | Comparison |
| Y-04 | K-02 | 62.1 | 72.5 | D | d | Comparison |
| Y-04 | K-03 | 62.1 | 62.6 | D | d | Comparison |
| Y-04 | K-04 | 62.1 | 74.5 | D | d | Comparison |
| Y-05 | K-01 | 32.5 | 34.2 | A | b | Present invention |
| Y-05 | K-05 | 32.5 | 33.8 | A | a | Present invention |
| Y-05 | M-01 | 32.5 | 34.0 | A | a | Present invention |
| Y-05 | M-05 | 32.5 | 32.9 | A | a | Present invention |

As it is obvious from Table 4, it is found that the Comparative Examples which do not satisfy the constitution of the invention are inferior in any one of the dot diameter and the accuracy of spotting position, but the Examples which satisfy the constitution of the invention are superior in all of the evaluations.

The invention includes the following embodiments.

<1> An ink set for inkjet recording, comprising: an ink composition including a dispersion of a pigment dispersed by a water-insoluble polymer which is formed by copolymerizing a monomer mixture containing a styrenic macromer, as well as self-dispersing polymer particles, a water-soluble organic solvent and water; and a reactive liquid which forms an aggregate when contacted with the ink composition.

<2> The ink set for inkjet recording of <1>, wherein the water-insoluble polymer is formed by copolymerizing a monomer mixture containing (a) a salt-generating group-containing monomer, (b) the styrenic macromer, (c) a styrenic monomer, and (d) a monomer represented by the following formula (I):

$$CH_2=C(R^1)COO(R^2O)_pR^3 \qquad \text{Formula (I)}$$

wherein $R^1$ represents a hydrogen atom or a lower alkyl group; $R^2$ represents a divalent hydrocarbon group having 1 to 30 carbon atoms, which may have a heteroatom; $R^3$ represents a monovalent hydrocarbon group having 1 to 30 carbon atoms, which may have a heteroatom; and p represents an integer of from 1 to 60.

<3> The ink set for inkjet recording of <2>, wherein the monomer mixture further comprises (e) a hydroxy group-containing monomer.

<4> The ink set for inkjet recording of <2>, wherein the monomer mixture further comprises a silicone macromer.

<5> The ink set for inkjet recording of <4>, wherein the silicone macromer is represented by the following formula (II):

$$X(Y)_qSi(R^4)_{3-r}(Z)_r \qquad \text{Formula (II)}$$

wherein X represents a polymerizable unsaturated group; Y represents a divalent linking group; $R^4$'s each independently represent a group selected from a hydrogen atom, a lower alkyl group, an aryl group or an alkoxy group; Z represents a monovalent residue of a siloxane polymer having a number average molecular weight of 500 or more; q represents 0 or 1; and r represents an integer of from 1 to 3.

<6> The ink set for inkjet recording of <2>, wherein the styrenic macromer has an acryloyloxy group or a methacryloyloxy group as a polymerizable functional group at one end.

<7> The ink set for inkjet recording of <2>, wherein the content of a structural unit derived from the (a) salt-generating group-containing monomer is 2 mass % to 40 mass % relative to the total mass of the water-insoluble polymer.

<8> The ink set for inkjet recording of <2>, wherein the content of a structural unit derived from the (b) styrenic macromer is 5 mass % to 20 mass % relative to the total mass of the water-insoluble polymer.

<9> The ink set for inkjet recording of <2>, wherein the content of a structural unit derived from the (c) styrenic monomer is 10 mass % to 80 mass % relative to the total mass of the water-insoluble polymer.

<10> The ink set for inkjet recording of <2>, wherein the content of a structural unit derived from the (d) monomer represented by formula (I) is 10 mass % to 40 mass % relative to the total mass of the water-insoluble polymer.

<11> The ink set for inkjet recording of <3>, wherein the content of a structural unit derived from the (e) hydroxy group-containing monomer is 7 mass % to 20 mass % relative to the total mass of the water-insoluble polymer.

<12> The ink set for inkjet recording of <1>, wherein the self-dispersing polymer particles comprise a self-dispersing polymer comprising a first polymer having a carboxy groups and an acid value of 25 to 100.

<13> The ink set for inkjet recording of <12>, wherein the self-dispersing polymer includes the first polymer which has been synthesized in an organic solvent, the carboxy groups of the first polymer is at least partially neutralized, and the self-dispersing polymer is prepared in the form of a polymer dispersion comprising water as a continuous phase.

<14> The ink set for inkjet recording of <1>, wherein the self-dispersing polymer particles comprise a self-dispersing polymer comprising a structural unit derived from an aromatic group-containing (meth)acrylate monomer, in which the content of the structural unit is 10 mass % to 95 mass % relative to the total mass of the self-dispersing polymer.

<15> The ink set for inkjet recording of <14>, wherein the aromatic group-containing (meth)acrylate monomer is phenoxyethyl acrylate.

<16> The ink set for inkjet recording of <1>, wherein the self-dispersing polymer particles comprise a self-dispersing polymer that has an acid value which is smaller than the acid value of the water-insoluble polymer.

<17> The ink set for inkjet recording of <1>, wherein the reactive liquid contains a compound having a carboxy group.

<18> An image recording method using the ink set for inkjet recording of <1>.

<19> The image recording method of <18>, comprising supplying the reactive liquid onto a recording medium, and contacting the reactive liquid with the ink composition to form an aggregate.

All publications, patent applications, and technical standards mentioned in this specification are herein incorporated by reference to the same extent as if each individual publication, patent application, or technical standard was specifically and individually indicated to be incorporated by reference.

What is claimed is:

1. An ink set for inkjet recording, comprising:
   an ink composition including a dispersion of a pigment dispersed by a water-insoluble polymer which is formed by copolymerizing a monomer mixture containing a styrenic macromer, and also including self-dispersing polymer particles, a water-soluble organic solvent and water; and
   a treating liquid that causes aggregation in the ink composition when contacted with the ink composition, the treating liquid including at least one acidic compound having a group selected from the group consisting of a phosphoric acid group, a phosphonic acid group, a phosphinic acid group, a sulfuric acid group, a sulfonic acid group, a sulfinic acid group, a carboxy group, and salts thereof.

2. The ink set for inkjet recording of claim 1, wherein the water-insoluble polymer is formed by copolymerizing a monomer mixture containing (a) a salt-generating group-containing monomer, (b) the styrenic macromer, (c) a styrenic monomer, and (d) a monomer represented by the following formula (I):

$$CH_2=C(R^1)COO(R^2O)_pR^3 \qquad \text{Formula (I)}$$

wherein $R^1$ represents a hydrogen atom or a lower alkyl group; $R^2$ represents a divalent hydrocarbon group having 1 to 30 carbon atoms, which may have a heteroatom; $R^3$ represents a monovalent hydrocarbon group having 1 to 30 carbon atoms, which may have a heteroatom; and p represents an integer of from 1 to 60.

3. The ink set for inkjet recording of claim 2, wherein the monomer mixture further comprises (e) a hydroxy group-containing monomer.

4. The ink set for inkjet recording of claim 2, wherein the monomer mixture further comprises a silicone macromer.

5. The ink set for inkjet recording of claim 4, wherein the silicone macromer is represented by the following formula (II):

$$X(Y)_q Si(R^4)_{3-r}(Z)_r \quad \text{Formula (II)}$$

wherein X represents a polymerizable unsaturated group; Y represents a divalent linking group; $R^4$s each independently represent a group selected from a hydrogen atom, a lower alkyl group, an aryl group or an alkoxy group; Z represents a monovalent residue of a siloxane polymer having a number average molecular weight of 500 or more; q represents 0 or 1; and r represents an integer of from 1 to 3.

6. The ink set for inkjet recording of claim 2, wherein the (b) styrenic macromer has an acryloyloxy group or a methacryloyloxy group as a polymerizable functional group at one end.

7. The ink set for inkjet recording of claim 2, wherein the content of a structural unit derived from the (a) salt-generating group-containing monomer is 2 mass % to 40 mass % relative to the total mass of the water-insoluble polymer.

8. The ink set for inkjet recording of claim 2, wherein the content of a structural unit derived from the (b) styrenic macromer is 5 mass % to 20 mass % relative to the total mass of the water-insoluble polymer.

9. The ink set for inkjet recording of claim 2, wherein the content of a structural unit derived from the (c) styrenic monomer is 10 mass % to 80 mass % relative to the total mass of the water-insoluble polymer.

10. The ink set for inkjet recording of claim 2, wherein the content of a structural unit derived from the (d) monomer represented by formula (I) is 10 mass % to 40 mass % relative to the total mass of the water-insoluble polymer.

11. The ink set for inkjet recording of claim 3, wherein the content of a structural unit derived from the (e) hydroxy group-containing monomer is 7 mass % to 20 mass % relative to the total mass of the water-insoluble polymer.

12. The ink set for inkjet recording of claim 1, wherein the self-dispersing polymer particles comprise a self-dispersing polymer comprising a first polymer having a carboxy group and an acid value of from 25 to 100.

13. The ink set for inkjet recording of claim 12, wherein the self-dispersing polymer includes the first polymer which has been synthesized in an organic solvent, the carboxy groups of the first polymer are at least partially neutralized, and the self-dispersing polymer is prepared in the form of a polymer dispersion comprising water as a continuous phase.

14. The ink set for inkjet recording of claim 1, wherein the self-dispersing polymer particles comprise a self-dispersing polymer comprising a structural unit derived from an aromatic group-containing (meth)acrylate monomer, in which the content of the structural unit is 10 mass % to 95 mass % relative to the total mass of the self-dispersing polymer.

15. The ink set for inkjet recording of claim 14, wherein the aromatic group-containing (meth)acrylate monomer is phenoxyethyl acrylate.

16. The ink set for inkjet recording of claim 1, wherein the self-dispersing polymer particles comprise a self-dispersing polymer that has an acid value which is smaller than the acid value of the water-insoluble polymer.

17. The ink set for inkjet recording of claim 1, wherein the reactive liquid contains a compound having a carboxy group.

18. An image recording method using the ink set for inkjet recording of claim 1.

19. The image recording method of claim 18, comprising supplying the reactive liquid onto a recording medium, and contacting the reactive liquid with the ink composition to form an aggregate.

20. The ink set for inkjet recording of claim 1, wherein the at least one acidic compound is selected from the group consisting of polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidonecarboxylic acid, pyronecarboxylic acid, pyrrolecarboxylic acid, furancarboxylic acid, pyridinecarboxylic acid, coumalic acid, thiophenecarboxylic acid, nicotinic acid, derivatives of these acids, and salts thereof.

21. The ink set for inkjet recording of claim 1, wherein the at least one acidic compound is contained in the treating liquid in an amount of from 10 to 80 mass % relative to the total mass of the treating liquid.

22. The ink set for inkjet recording of claim 1, wherein the treating liquid has a pH of from 1 to 6.

* * * * *